United States Patent
Li et al.

(10) Patent No.: US 11,086,890 B1
(45) Date of Patent: Aug. 10, 2021

(54) EXTRACTION RULE VALIDATION

(71) Applicant: SPLUNK INC., San Francisco, CA (US)

(72) Inventors: Li Li, Richmond (CA); Yongxin Su, Richmond (CA); Ting Yuan, Waterloo (CA); Qian Jie Zhong, Vancouver (CA); Yiyun Zhu, Vancouver (CA)

(73) Assignee: SPLUNK Inc., San Francisco, CA (US)

( * ) Notice: Subject to any disclaimer, the term of this patent is extended or adjusted under 35 U.S.C. 154(b) by 191 days.

(21) Appl. No.: 16/264,525

(22) Filed: Jan. 31, 2019

(51) Int. Cl.
 *G06F 16/2458* (2019.01)
 *H04L 29/08* (2006.01)
 *G06F 3/0484* (2013.01)

(52) U.S. Cl.
 CPC ...... *G06F 16/2465* (2019.01); *G06F 3/04847* (2013.01); *H04L 67/10* (2013.01)

(58) Field of Classification Search
 CPC ... G06F 16/2465; G06F 3/04847; H04L 67/10
 USPC .................................................. 707/755, 754
 See application file for complete search history.

(56) References Cited

U.S. PATENT DOCUMENTS

| | | | |
|---|---|---|---|
| 7,669,119 B1 | 2/2010 | Orelind et al. | |
| 7,689,536 B1 | 3/2010 | Weissman et al. | |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,135,560 B1 * | 9/2015 | Saurabh | G06N 5/046 |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2004/0123101 A1 * | 6/2004 | Rineer | H04L 63/123 |
| | | | 713/161 |
| 2004/0148298 A1 | 7/2004 | Terasawa | |
| 2011/0246442 A1 | 10/2011 | Bartell | |
| 2016/0124979 A1 * | 5/2016 | Claux | H04L 67/02 |
| | | | 707/755 |
| 2016/0224804 A1 * | 8/2016 | Carasso | G06F 3/0484 |
| 2016/0224899 A1 * | 8/2016 | Nguyen | G06N 7/005 |
| 2017/0286038 A1 * | 10/2017 | Li | G06F 3/14 |
| 2017/0286455 A1 * | 10/2017 | Li | G06F 16/24575 |
| 2018/0336477 A1 | 11/2018 | Kashiwagi et al. | |
| 2019/0098106 A1 | 3/2019 | Mungel et al. | |
| 2019/0171728 A1 | 6/2019 | Wakankar et al. | |

OTHER PUBLICATIONS

Splunk Enterprise 8.0.0 Overview, available online, retrieved May 20, 2020 from docs.splunk.com.

(Continued)

*Primary Examiner* — Michael Pham
(74) *Attorney, Agent, or Firm* — Shook, Hardy & Bacon L.L.P.

(57) ABSTRACT

Embodiments of the present invention are directed to validating extraction rules. In embodiments, a set of events for which field extraction is desired is obtained. Thereafter, an extraction rule is applied to the set of events to extract fields of the events. The application of the extraction rule can be monitored to determine that the applied extraction rule is invalid. Based on the applied extraction rule being invalid, a new extraction rule can be generated to apply to the set of events.

28 Claims, 36 Drawing Sheets

(56) References Cited

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

FIG. 6A

Data Summary

| Hosts (5) | Sources (8) | Sourcetypes (3) | | ✕ |

*filter*

| Host ⟡ | | Count ⟡ | Last Update ⟡ |
|---|---|---|---|
| mailsv | ıl ∨ | 9,829 | 4/29/14 1:32:47.000 PM |
| vendor_sales | ıl ∨ | 30,244 | 4/29/14 1:32:46.000 PM |
| www1 | ıl ∨ | 24,221 | 4/29/14 1:32:44.000 PM |
| www2 | ıl ∨ | 22,595 | 4/29/14 1:32:47.000 PM |
| www3 | ıl ∨ | 22,975 | 4/29/14 1:32:45.000 PM |

INCIDENT REVIEW DATSHBOARD 910

Incident Review | Actions▼

| Status: | Urgency: high | Owner: | Title: |
| --- | --- | --- | --- |
| Security domain: | Governance: pci | Search: | |

INCIDENT ATTRIBUTE FIELDS 911

TIME RANGE FIELD 912

24 hour window ▼
- Last 15 minutes
- Last 60 minutes
- Last 4 hours
- Last 24 hours
- Last 7 days
- Last 30 days
- Last year
- Real-time
- Other
- All time
- Custom time...

◀ | i | 🖶 | 💾 Save ▼ | 📊 Create ▼    Linear scale ▼   1 bar = 1 hour

TIMELINE 913    120    60

✓ 225 matching events

🔍 Hide   🔍 Zoom out   🔍 Zoom to selection   [u] Deselect 120
60

4:00 AM        6:00 AM        8:00 AM
Sun Aug 26
2012

225 events in a 24 hour window (real-time) (from 11:29:20 AM August 25 to 11:29:20 AM August 26, 2012) | Edit selected events | Edit all 225 matching Select all | Unselect all  « prev  1  2  3  4  5  6  7  8  9  10  next »

EVENTS LIST 914

| Select | Options | Time | Security Domain | Title | Urgency | Status | Owner | |
| --- | --- | --- | --- | --- | --- | --- | --- | --- |
| ☐ | ▶ | 8/26/12 11:11:03.000 AM | Access ▼ | Insecure Or Cleartext Authentication Detected ▼ | ⓘ High ▼ | New ▼ | unassigned ▼ | View details |
| ☐ | ▶ | 8/26/12 11:10:07.000 AM | Access ▼ | Insecure Or Cleartext Authentication Detected ▼ | ⓘ High ▼ | New ▼ | unassigned ▼ | View details |
| ☐ | ▶ | 8/26/12 11:00:39.000 AM | Access ▼ | Account (blinebry) Deleted On (PROD-POS-001) ▼ | ⓘ High ▼ | New ▼ | unassigned ▼ | View details |
| ☐ | ▶ | 8/26/12 11:00:39.000 AM | Access ▼ | Account (beu) Deleted On (COREDEV-006) ▼ | ⓘ High ▼ | New ▼ | unassigned ▼ | View details |
| ☐ | ▶ | 8/26/12 11:00:39.000 AM | Access ▼ | Account (combs) Deleted On (HOST-005) ▼ | ⓘ High ▼ | New ▼ | unassigned ▼ | View details |
| ☐ | ▶ | 8/28/12 | Access ▼ | Account (wisner) Deleted On (BUSDEV-005) ▼ | ⓘ High ▼ | New ▼ | unassigned ▼ | View details |

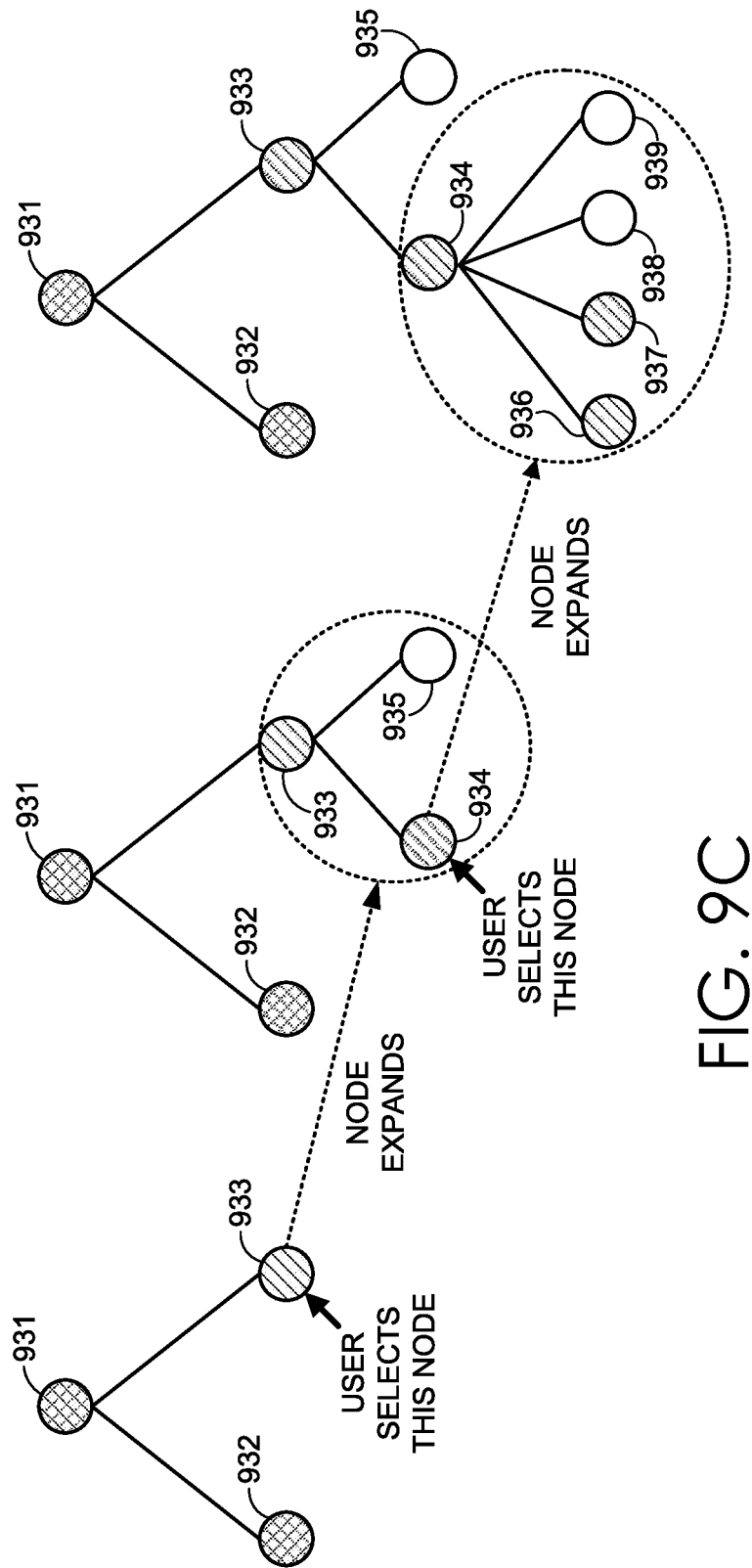

New Pivot 1,966 events (before 9/22/13 5:19:02.000 PM)

Filters: Highest 10 product name by price

- All time
- Highest 10 produ.... — 1401

Split Rows
- product name — 1402

Split Columns — 1403

Column Values
- Count of Success....
- Sum of price

[Save As... ▼] [Clear] [Complete] [Successful_purchases ▼]

Documentation

| product name ↕ | price ↕ | Count of Successful purchases ↕ | Sum of price ▼ |
|---|---|---|---|
| Dream Crusher | 39.99 | 227 — 1404 | 9077.73 — 1405 |
| Manganiello Bros. | 39.99 | 199 | 7958.01 |
| Orvil the Wolverine | 39.99 | 169 | 6758.31 |
| World of Cheese | 24.99 | 267 | 6672.33 |
| Mediocre Kingdoms | 24.99 | 250 | 6247.50 |
| SIM Cubicle | 19.99 | 233 | 4657.67 |
| Final Sequel | 24.99 | 181 | 4523.19 |
| Benign Space Debris | 24.99 | 135 | 3373.65 |
| Curling 2014 | 19.99 | 126 | 2518.74 |
| Holy Blade of Gouda | 5.99 | 179 | 1072.21 |

| component ⇄ | NULL ⇄ | conf ⇄ | deploy-connections ⇄ | deploy-server ⇄ | map ⇄ | mpool ⇄ | per_host_thruput ⇄ | per_index_thruput ⇄ | per_source_thruput ⇄ | per_sourcetype_thruput ⇄ | pipeline ⇄ | queue ⇄ | realtime_search_data ⇄ |
|---|---|---|---|---|---|---|---|---|---|---|---|---|---|
| BucketMover | 4 | 0 | 0 | 0 | 0 | 0 | 0 | 0 | 0 | 0 | 0 | 0 | 0 |
| DatabaseDirectoryManager | 4 | 0 | 0 | 0 | 0 | 0 | 0 | 0 | 0 | 0 | 0 | 0 | 0 |
| DateParserVerbose | 562 | 0 | 0 | 0 | 0 | 0 | 0 | 0 | 0 | 0 | 0 | 0 | 0 |
| DiskMon | 3 | 0 | 0 | 0 | 0 | 0 | 0 | 0 | 0 | 0 | 0 | 0 | 0 |
| IndexConfig | 1 | 0 | 0 | 0 | 0 | 0 | 0 | 0 | 0 | 0 | 0 | 0 | 0 |
| LicenseUsage | 2872 | 0 | 0 | 0 | 0 | 0 | 0 | 0 | 0 | 0 | 0 | 0 | 0 |
| Metrics | 0 | 1 | 972 | 2916 | 972 | 972 | 4621 | 2843 | 9314 | 0 | 9306 | 18797 | 12636 | 972 |
| OneShotWriter | 12226 | 0 | 0 | 0 | 0 | 0 | 0 | 0 | 0 | 0 | 0 | 0 | 0 |
| TailingProcessor | 2 | 0 | 0 | 0 | 0 | 0 | 0 | 0 | 0 | 0 | 0 | 0 | 0 |
| WatchedFile | 18 | 0 | 0 | 0 | 0 | 0 | 0 | 0 | 0 | 0 | 0 | 0 | 0 |
| cached | 5 | 0 | 0 | 0 | 0 | 0 | 0 | 0 | 0 | 0 | 0 | 0 | 0 |
| decorators | 2 | 0 | 0 | 0 | 0 | 0 | 0 | 0 | 0 | 0 | 0 | 0 | 0 |
| utils | 1 | 0 | 0 | 0 | 0 | 0 | 0 | 0 | 0 | 0 | 0 | 0 | 0 |
| view | 6 | 0 | 0 | 0 | 0 | 0 | 0 | 0 | 0 | 0 | 0 | 0 | 0 |

*FIG. 20C*

| | | | Back | Add New Rule |
|---|---|---|---|---|
| i | Name ~2010 | | | Type |
| > | ipv4 | | | |
| | Edit | Delete | | |
| | Field | Value | | |
| | regex | (\d{1,3}\.\d{1,3}\.\d{1,3}\.\d{1,3}) | | regex |
| | suffix | ([^\d\.]) | | |
| | type | regex | | |
| | name | ipv4 | | |
| | prefix | ([^\d\.]) | | |
| > | mac | | | regex |
| > | ipv6 | | | regex |
| > | port | | | regex |
| > | email | | | regex |
| > | url | | | regex |
| > | domain_name | | | regex |
| > | number | | | regex |
| > | cve | | | regex |
| > | interface | | | regex |
| > | http_status | | | keyword |
| > | tcp_flag | | | keyword |

2008

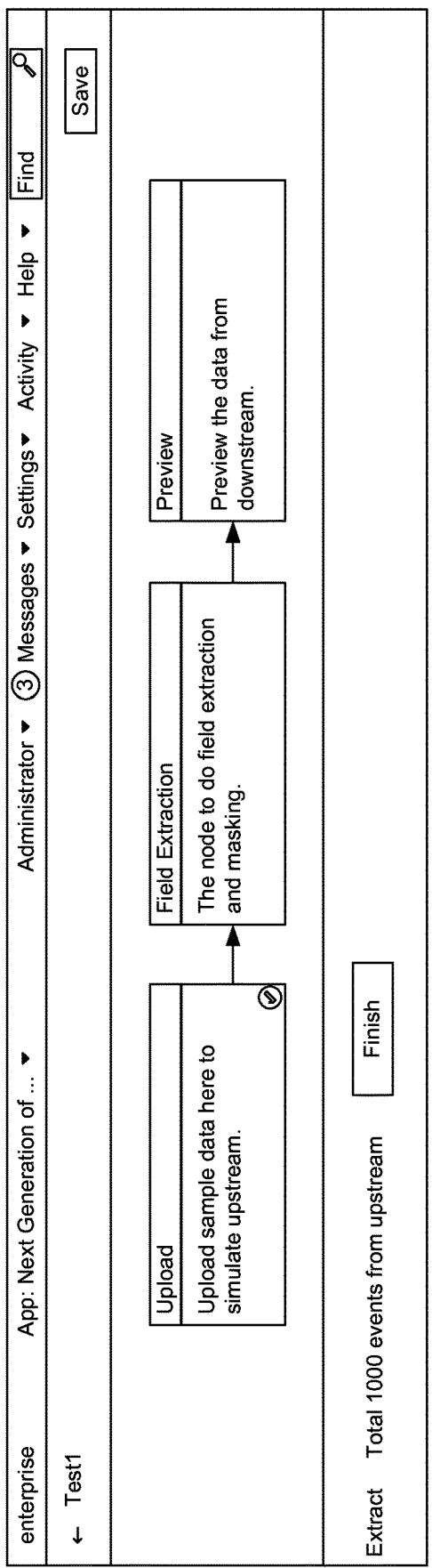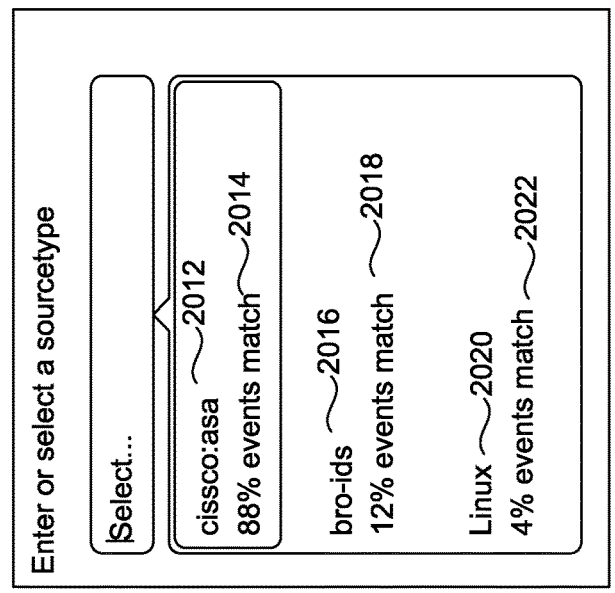
FIG. 20D

EXTRACTION RULE VALIDATION

CROSS-REFERENCE TO RELATED APPLICATIONS

The present application is related to co-pending of U.S. patent application Ser. No. 16/264,517 filed Jan. 31, 2019 and titled "ENHANCING EXTRACTION RULES BASED ON USER FEEDBACK," the contents of which are incorporated by reference herein in their entirety.

BACKGROUND

Modern data centers often include thousands of hosts that operate collectively to service requests from even larger numbers of remote clients. During operation, components of these data centers can produce significant volumes of raw, machine-generated data. In many cases, extraction rules are utilized to extract data.

BRIEF DESCRIPTION OF THE DRAWINGS

In the drawings:

FIG. 6A illustrates a search screen in accordance with the disclosed embodiments;

FIG. 6B illustrates a data summary dialog that enables a user to select various data sources in accordance with the disclosed embodiments;

FIG. 9B illustrates an incident review dashboard in accordance with the disclosed embodiments;

FIG. 9C illustrates a proactive monitoring tree in accordance with the disclosed embodiments;

FIGS. 12-14 illustrate a series of user interface screens for an example data model-driven report generation interface in accordance with the disclosed embodiments;

FIGS. 15-17 illustrate example visualizations generated by a reporting application in accordance with the disclosed embodiments;

FIGS. 20A-20H depict illustrative user interfaces that may be used to facilitate enhancement of extraction rules, according to embodiments of the present invention;

DETAILED DESCRIPTION

Figure 1:
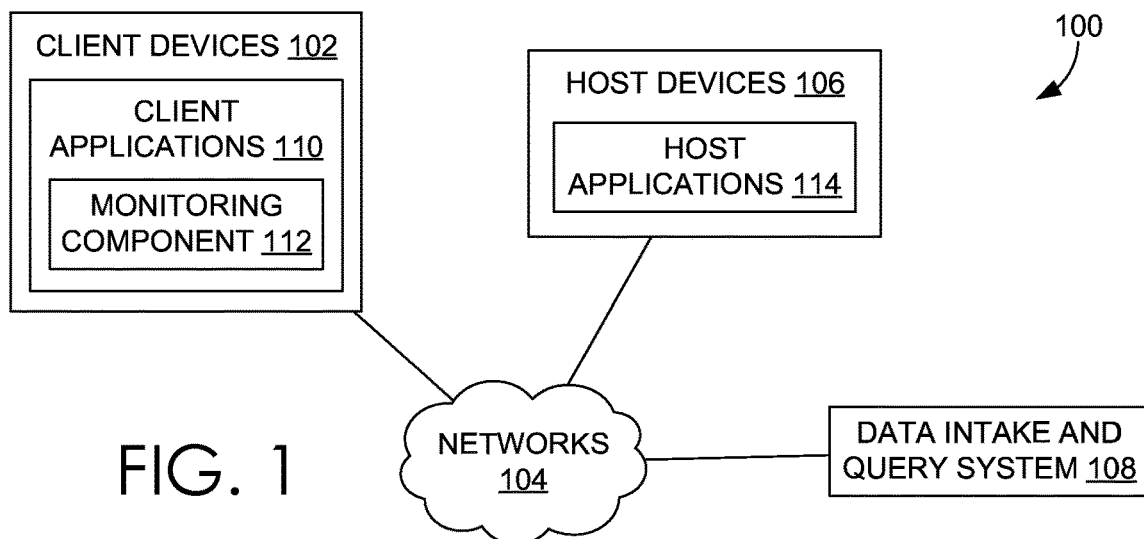
FIG. 1 illustrates a networked computer environment in which an embodiment may be implemented.

Embodiments are described herein according to the following outline:
1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Example Search Screen
   2.9. Data Modeling
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Data Center Monitoring
   2.13. Cloud-Based System Overview
   2.14. Searching Externally Archived Data
      2.14.1. ERP Process Features
   2.15 Cloud-Based Architecture
3.0. Overview of Facilitating Extraction Rule Enhancement and Validation In A Data Processing Environment
   3.1. Overview of a Field Extraction System in a Data Processing Environment
   3.2. Extraction Rule Enhancement via Build-Time Implementation
   3.3 Extraction Rule Validation and Enhancement via Run-Time Implementation
   3.4. Illustrative Hardware System
1.0 General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
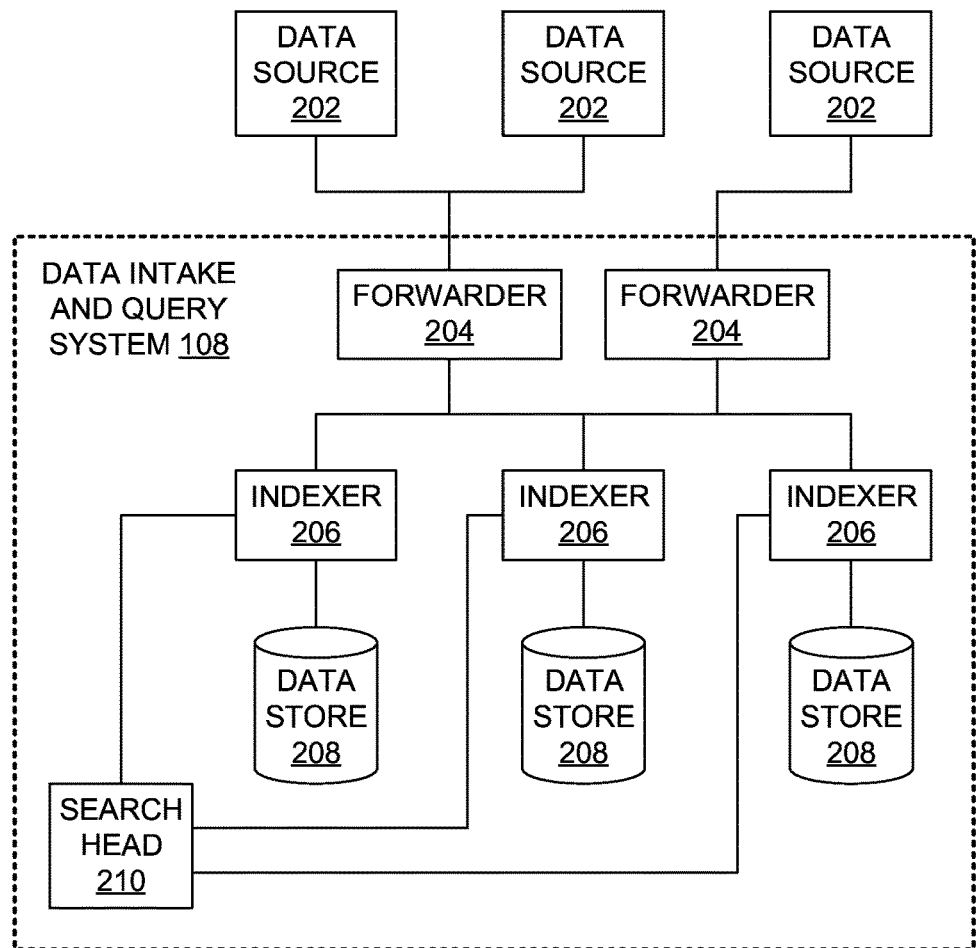
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
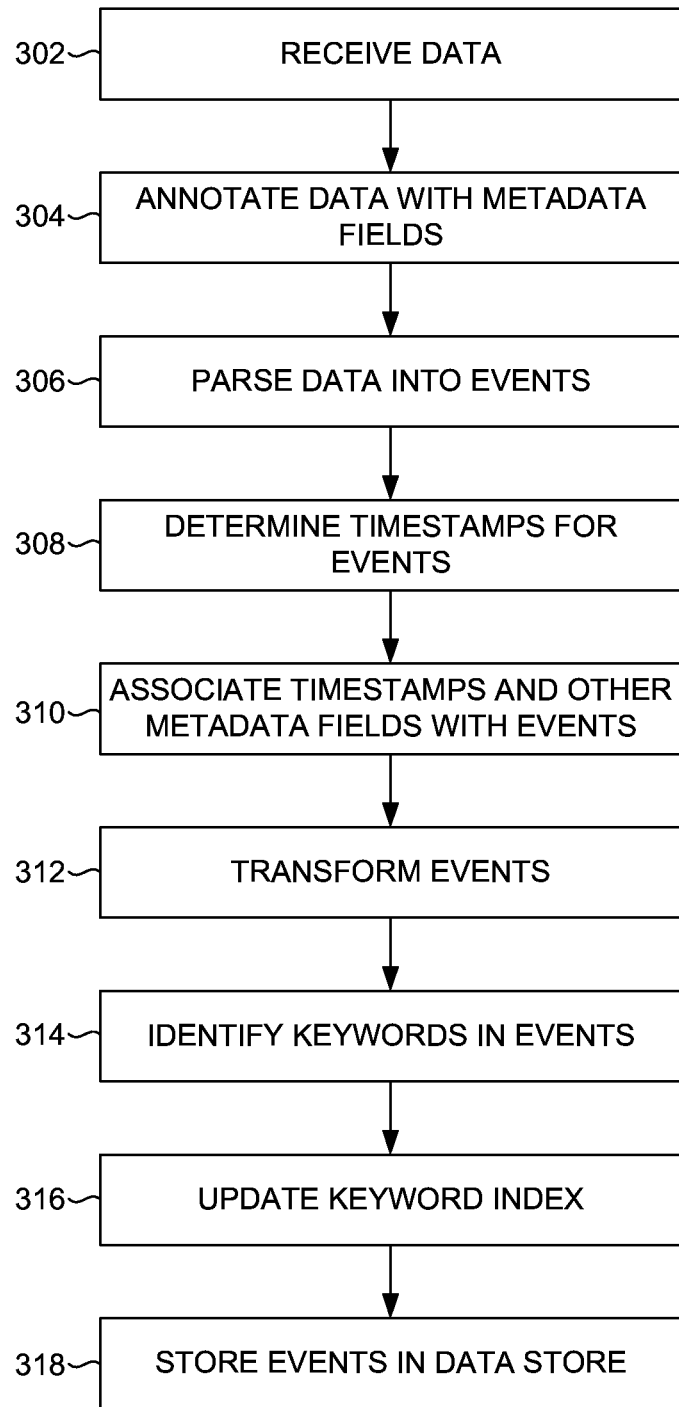
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
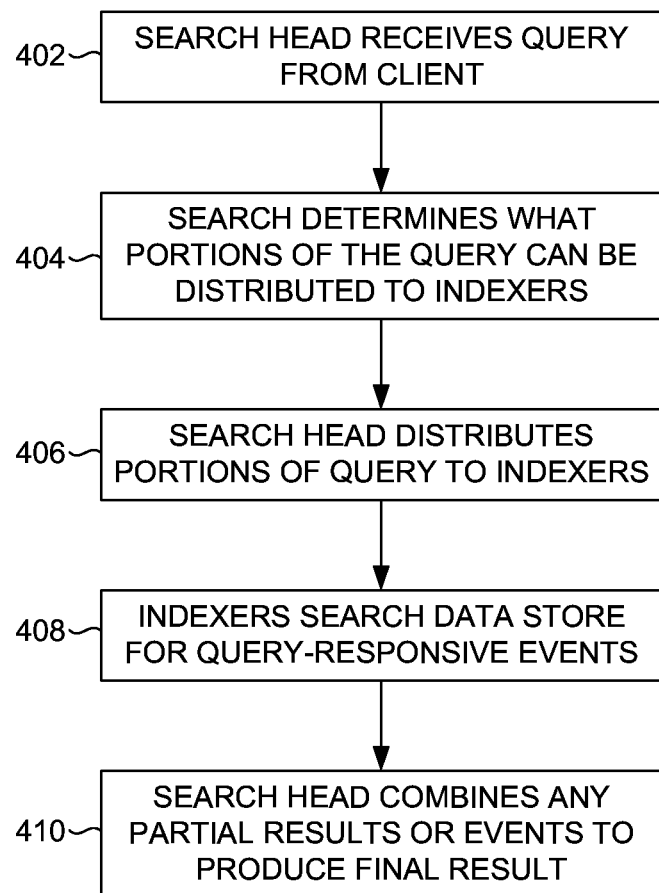
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
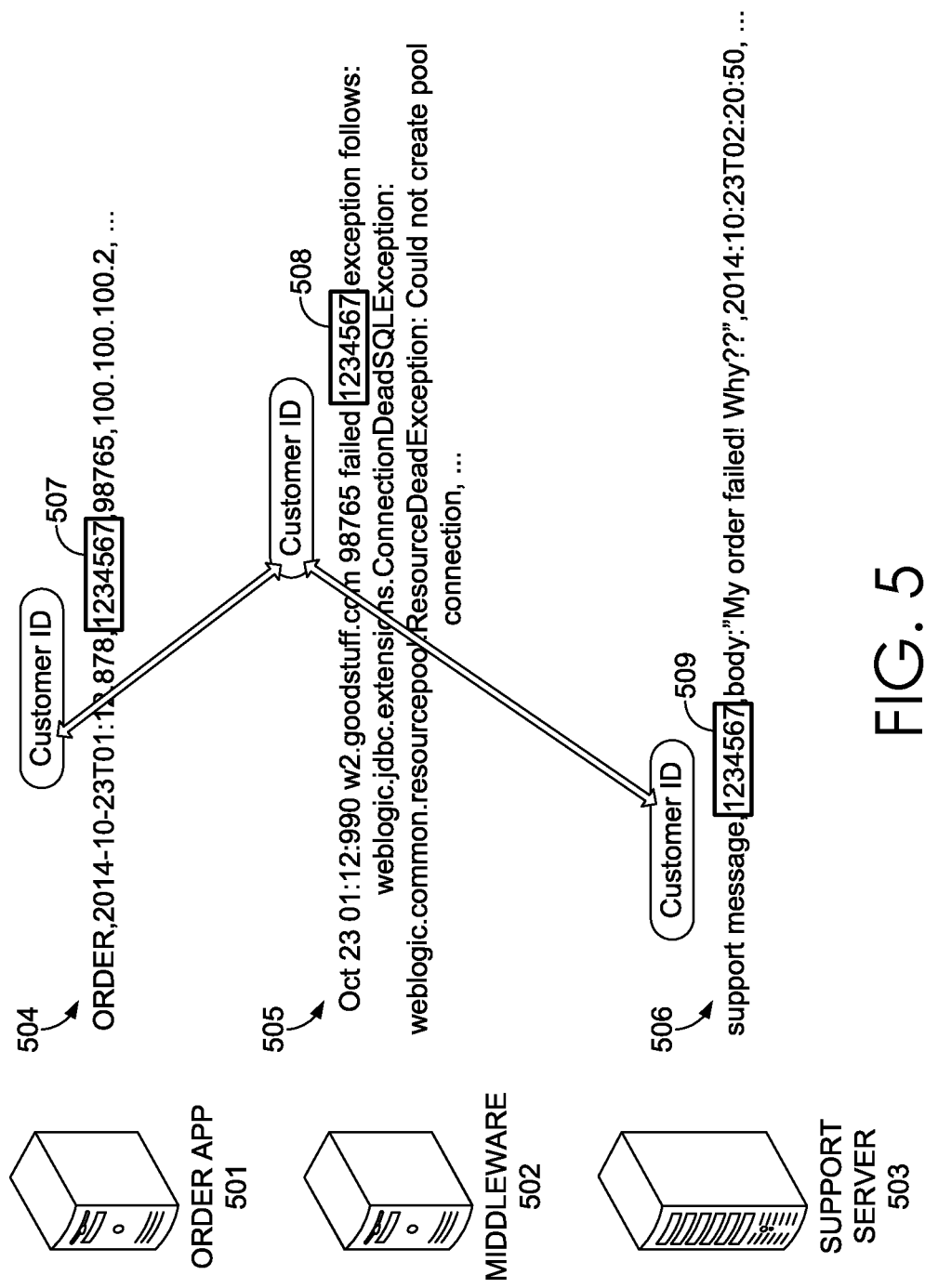
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
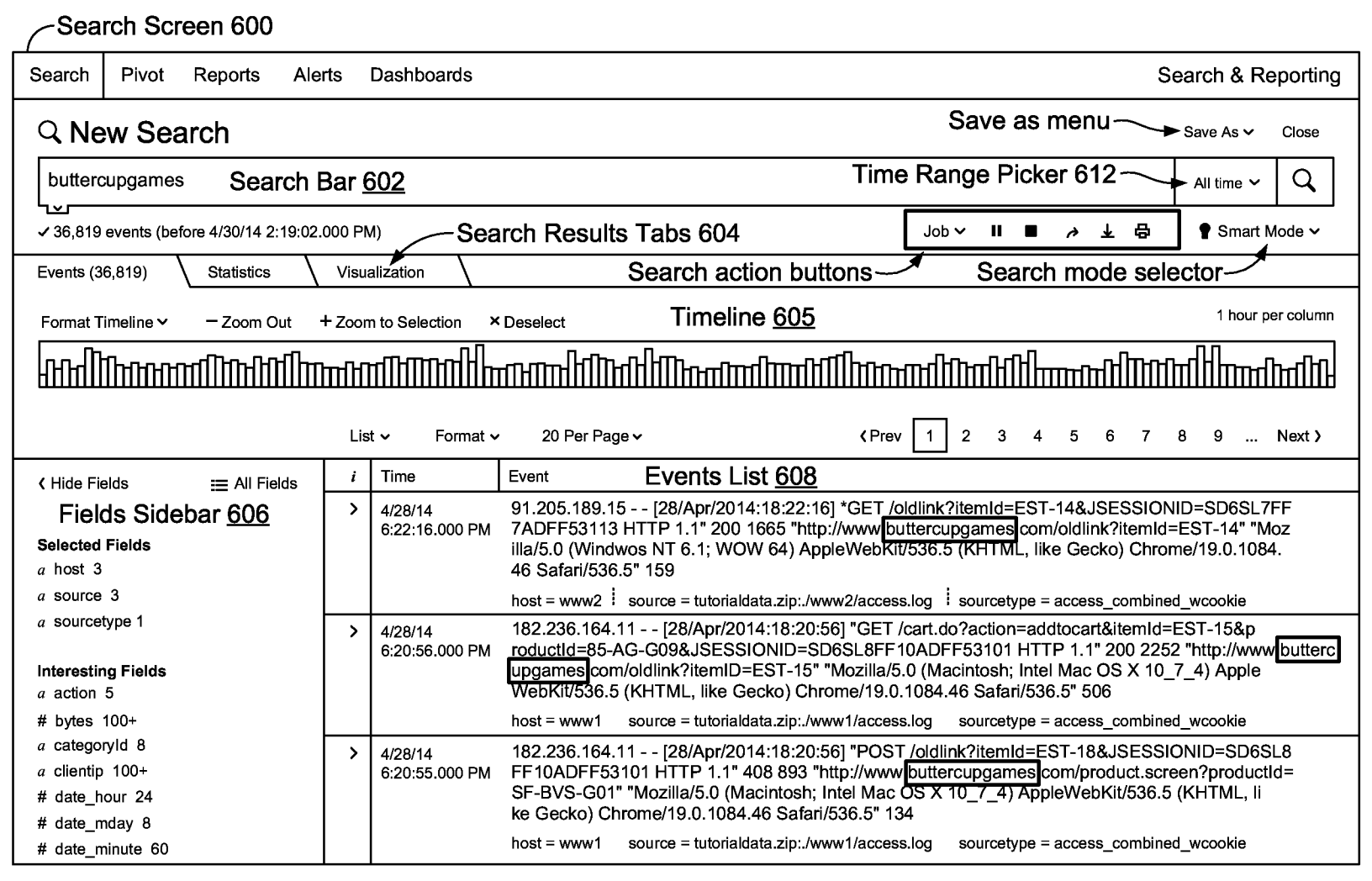

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
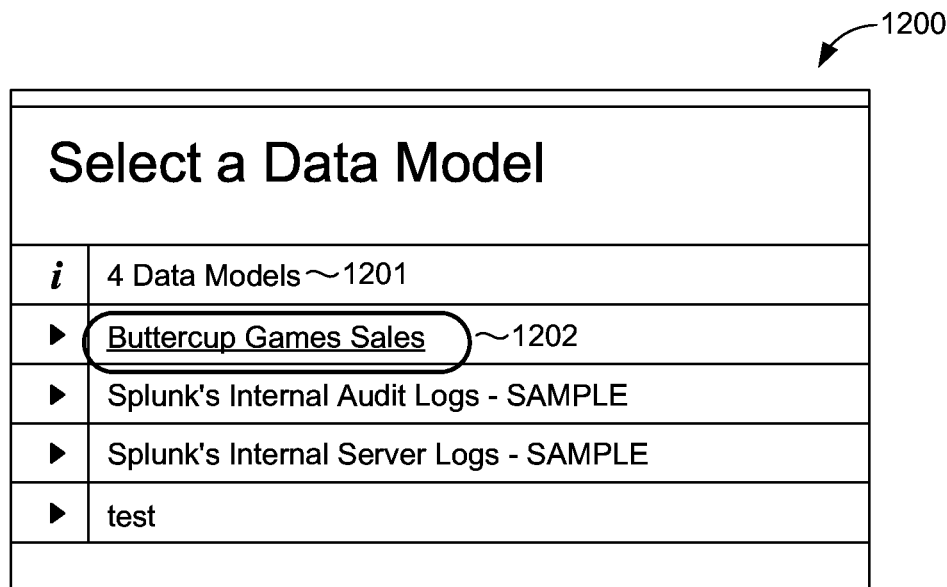

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
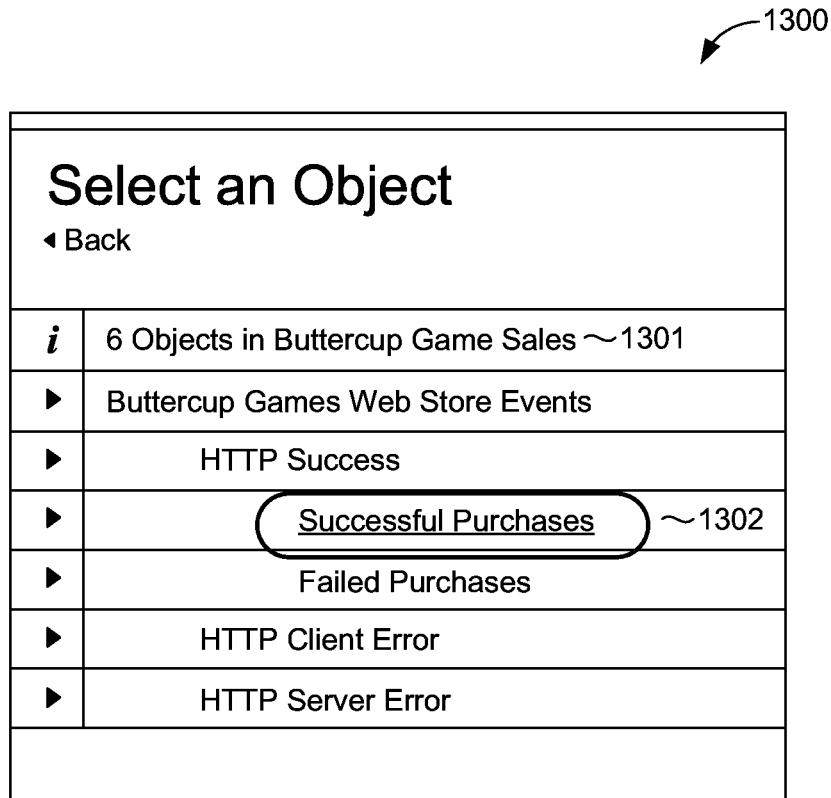

FIG. 13 illustrates an example data model object selection graphical user interface 1300 that displays available data objects 1301 for the selected data object model 1202. The user may select one of the displayed data model objects 1302 for use in driving the report generation process.

Figure 7A:
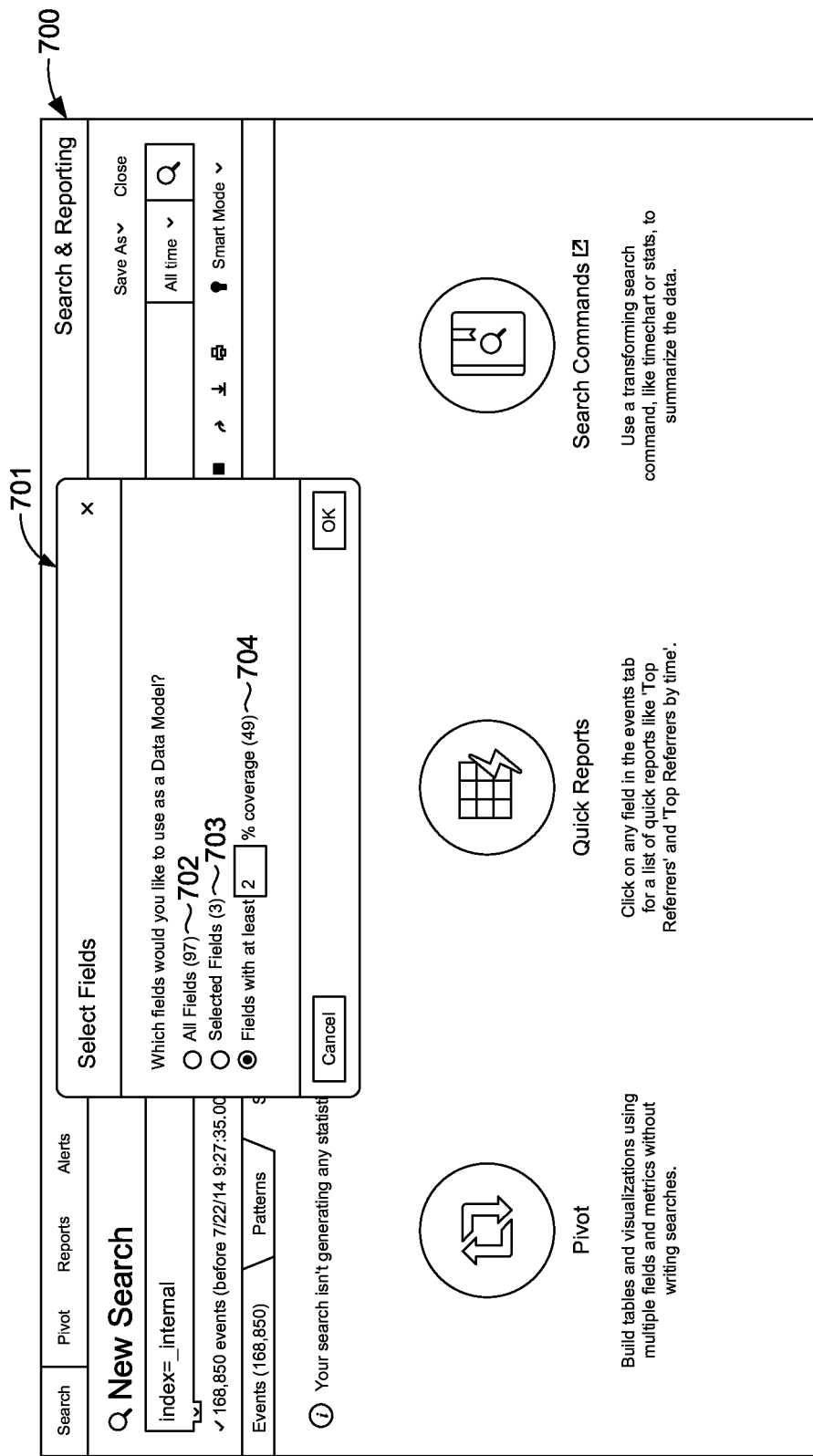
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
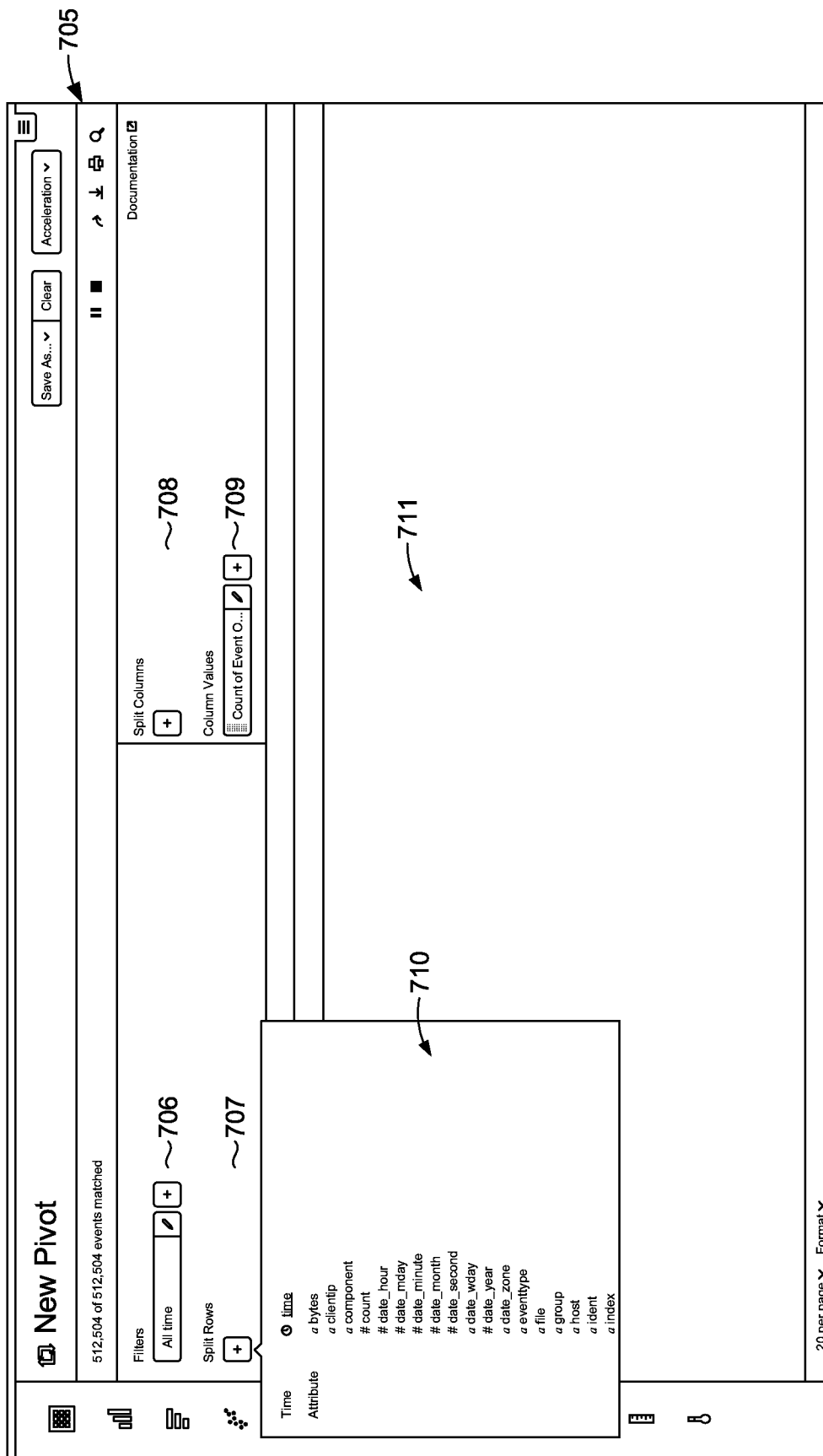
Figure 7C:
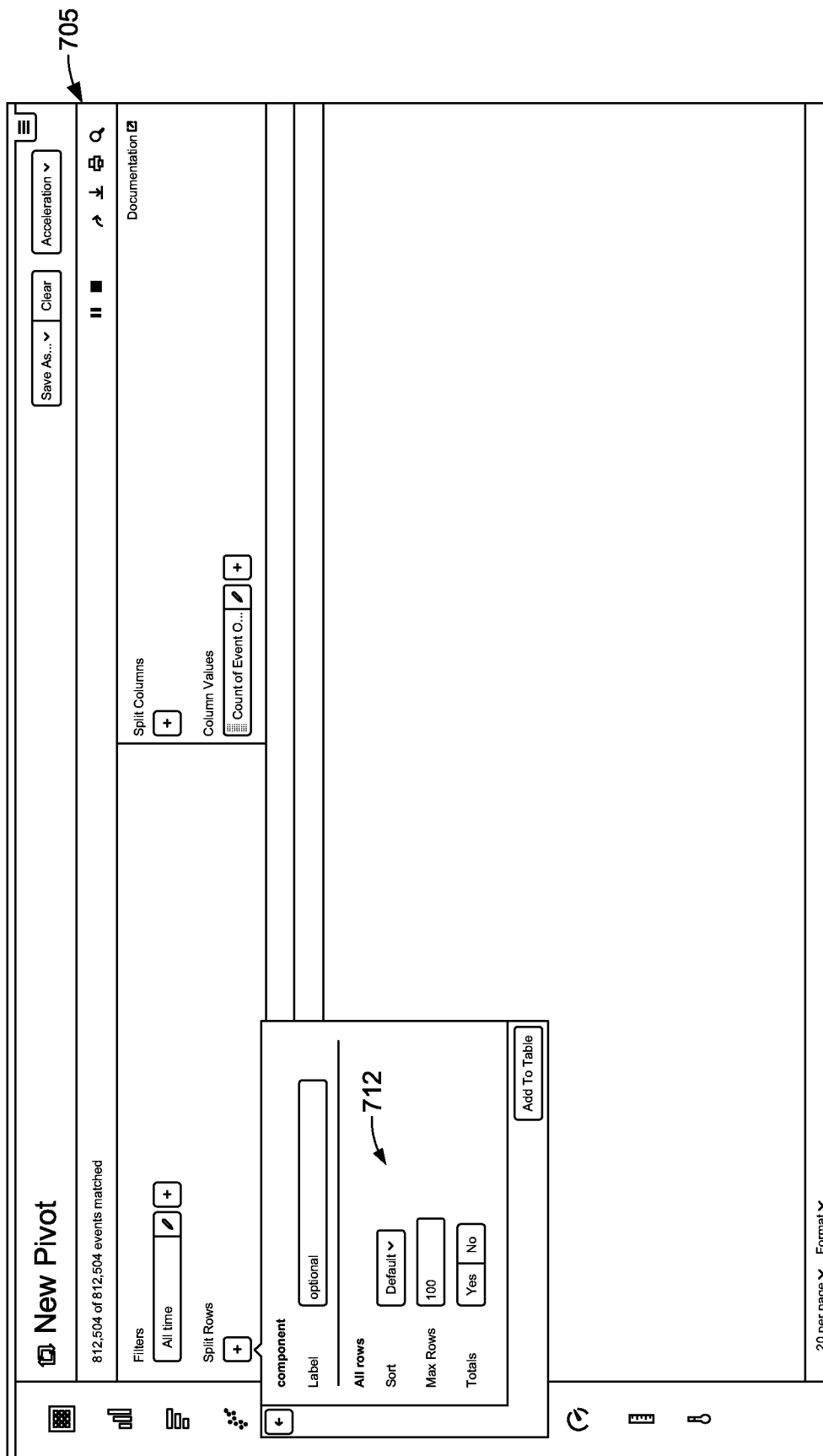

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
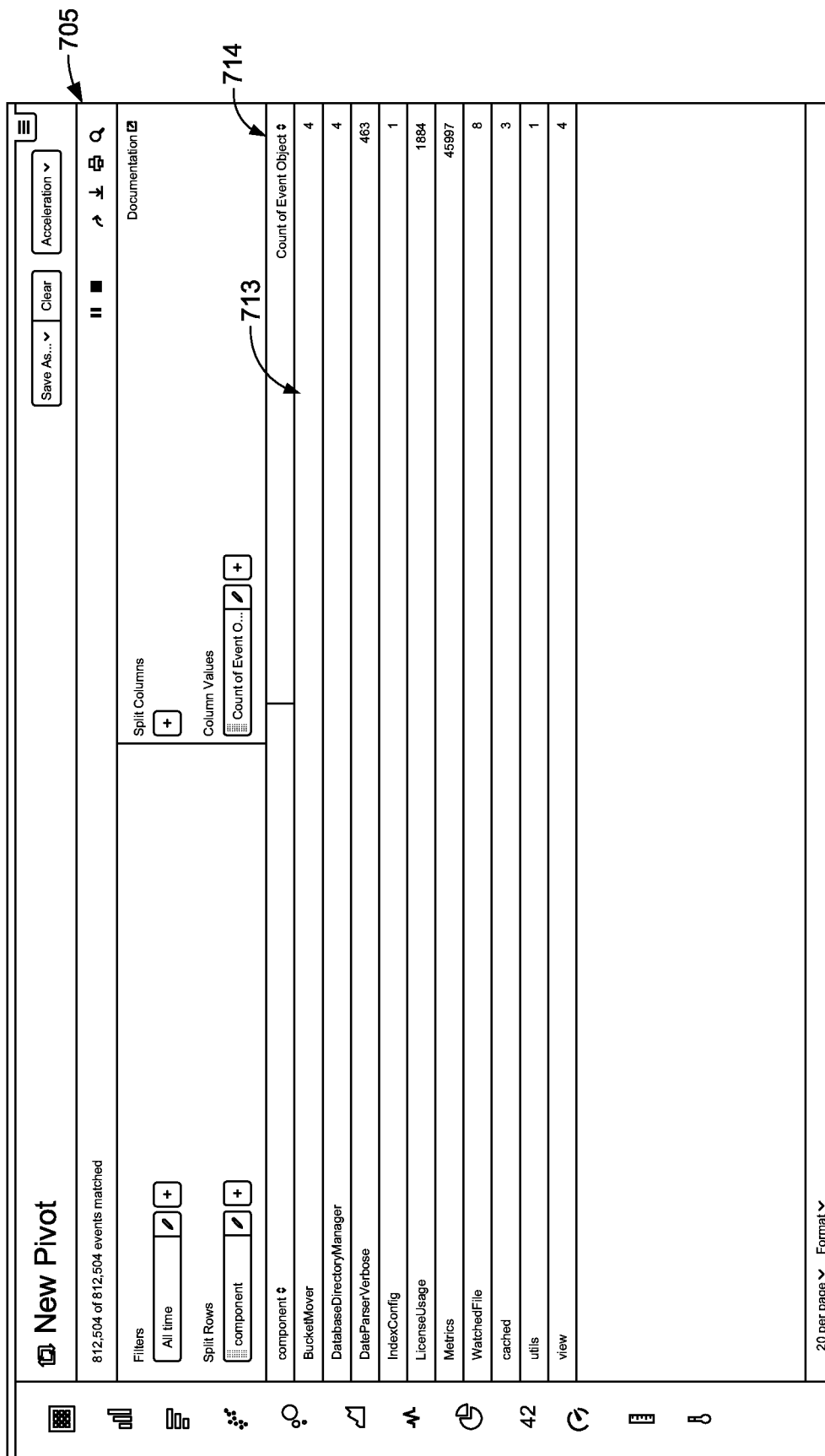

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. These statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 16:
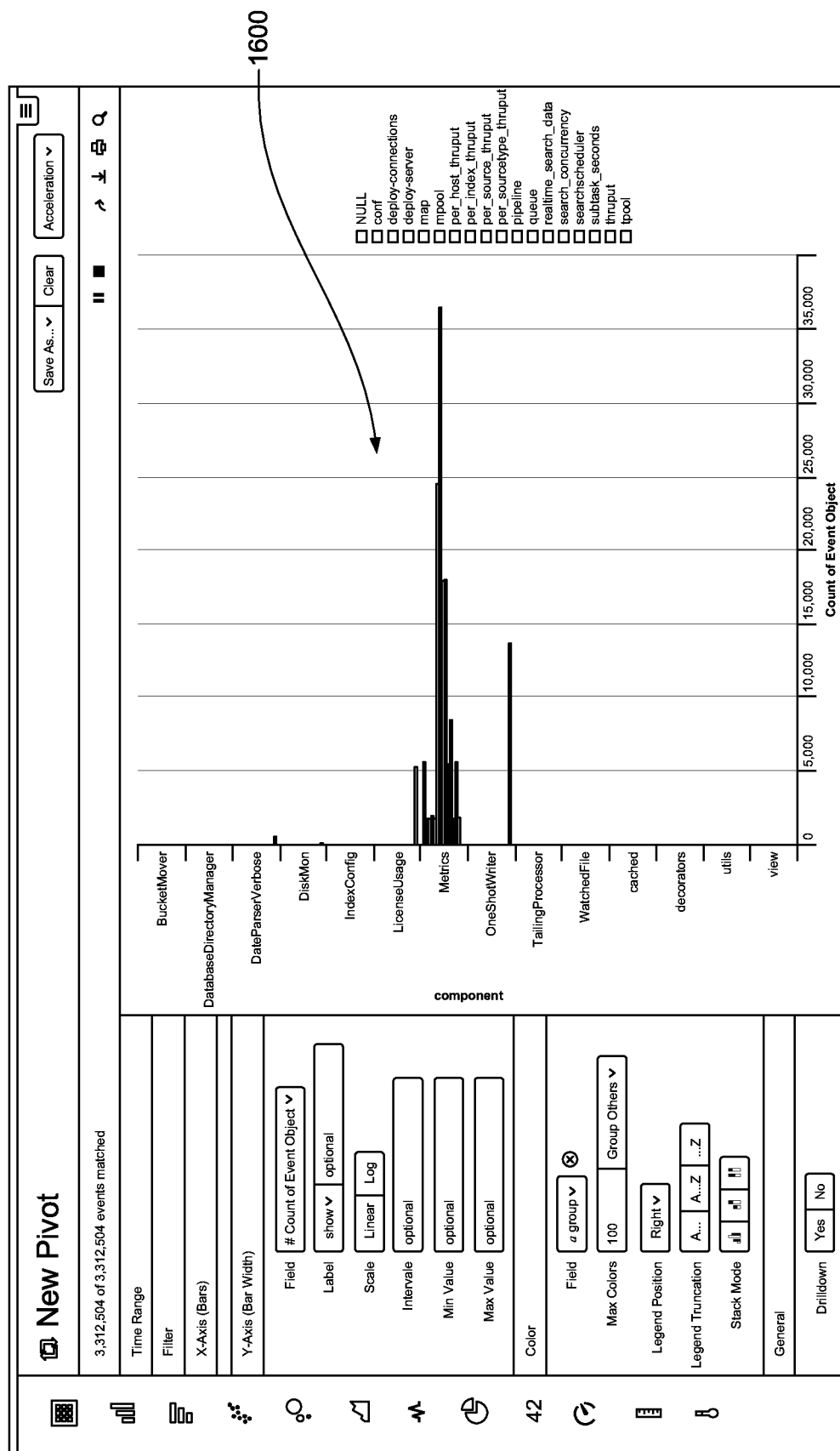
Figure 17:
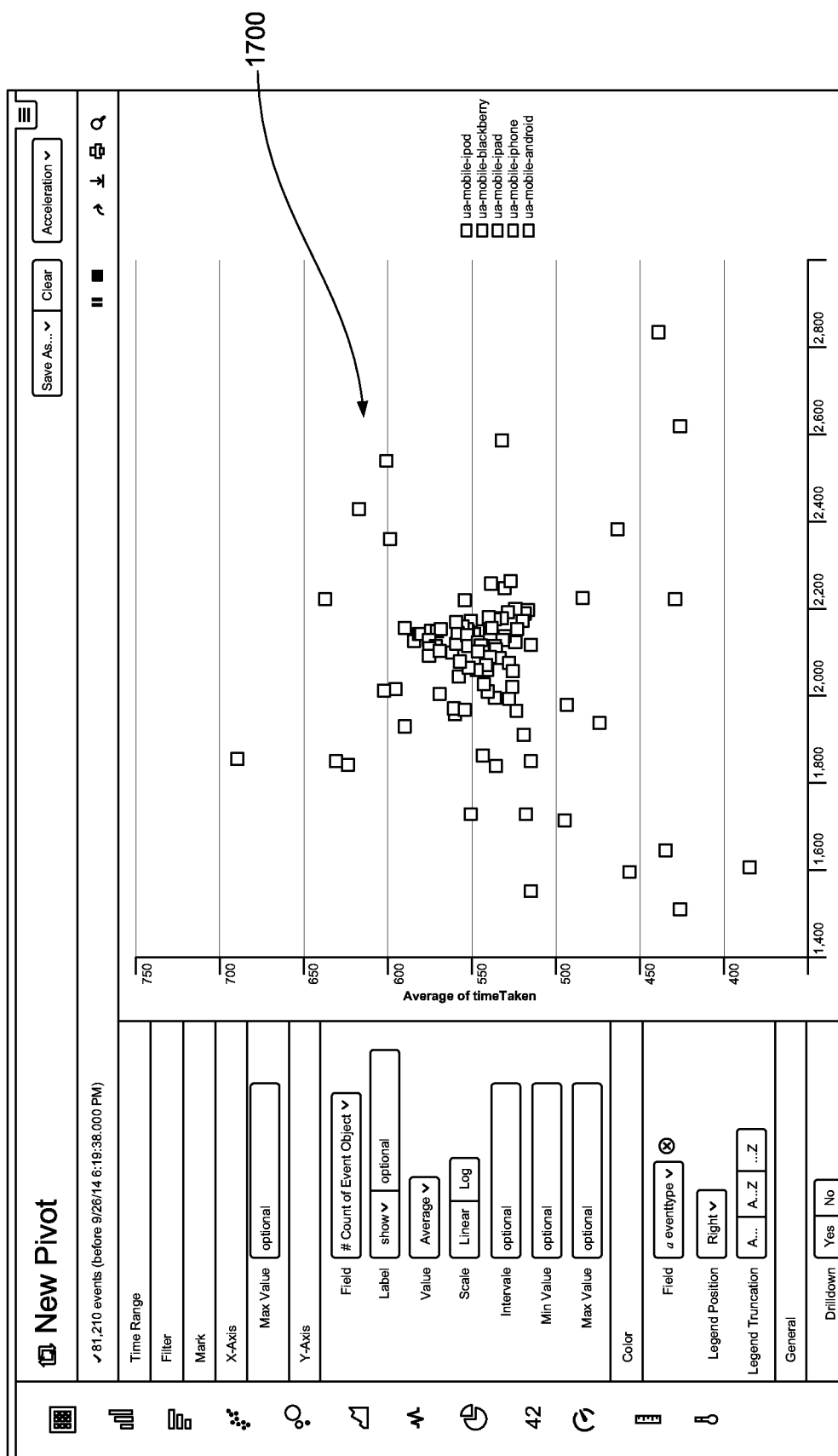

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
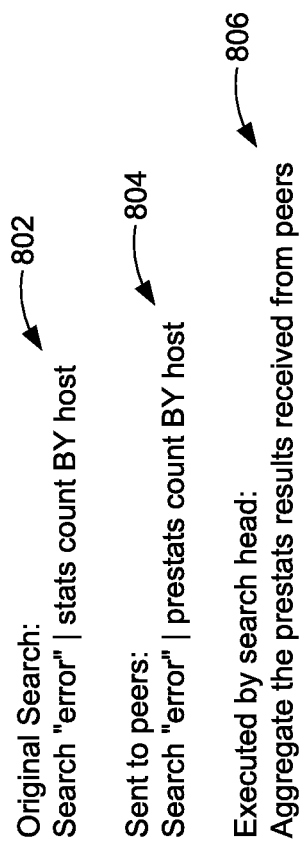
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
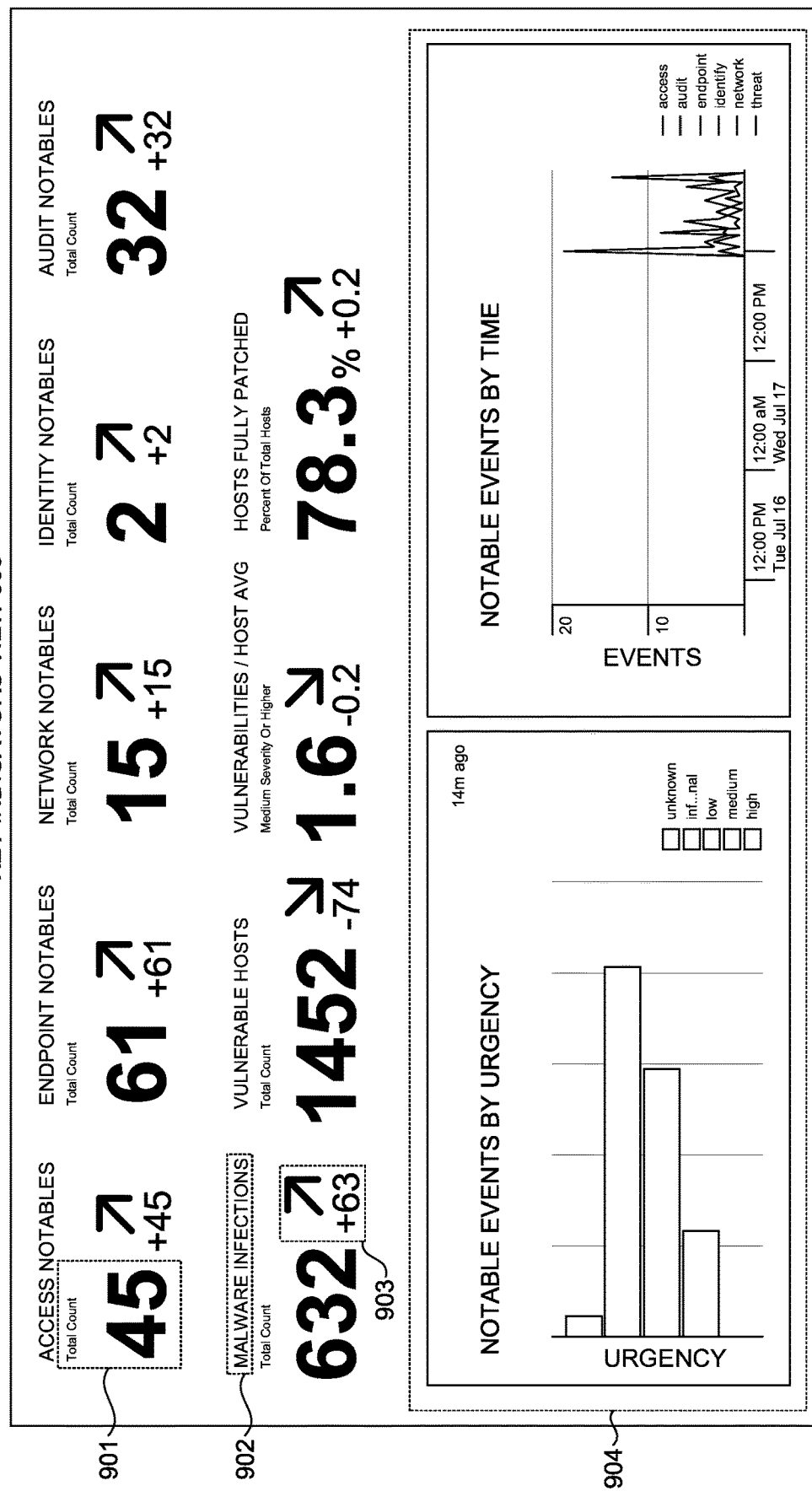
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMA- TION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
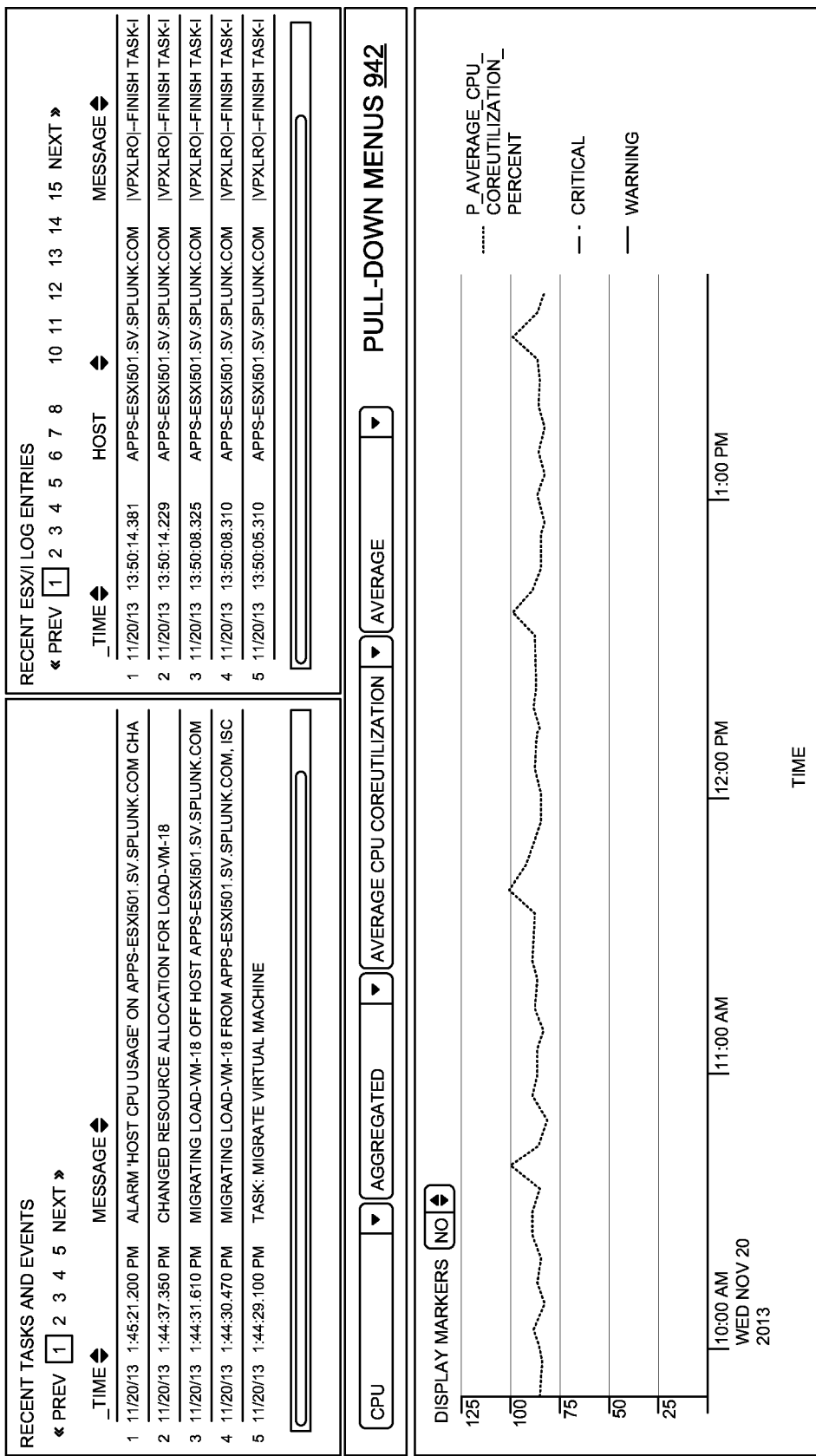
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
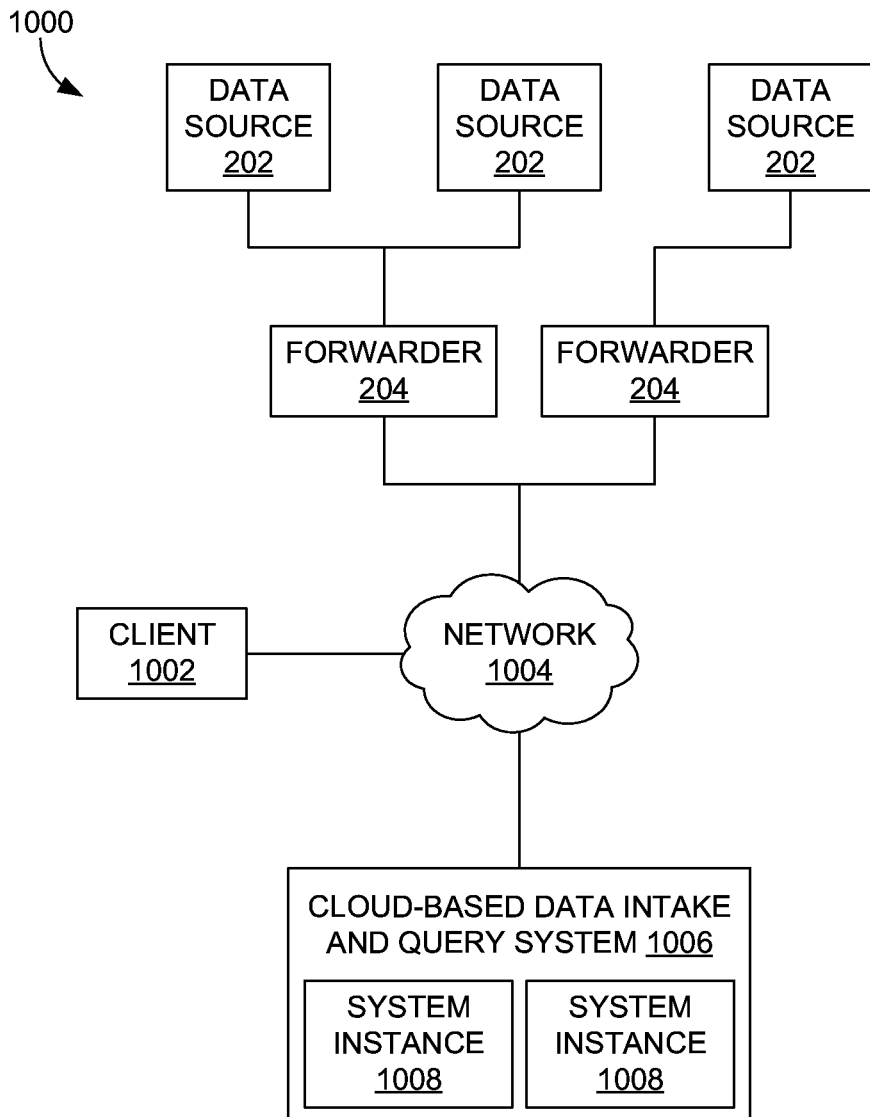
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
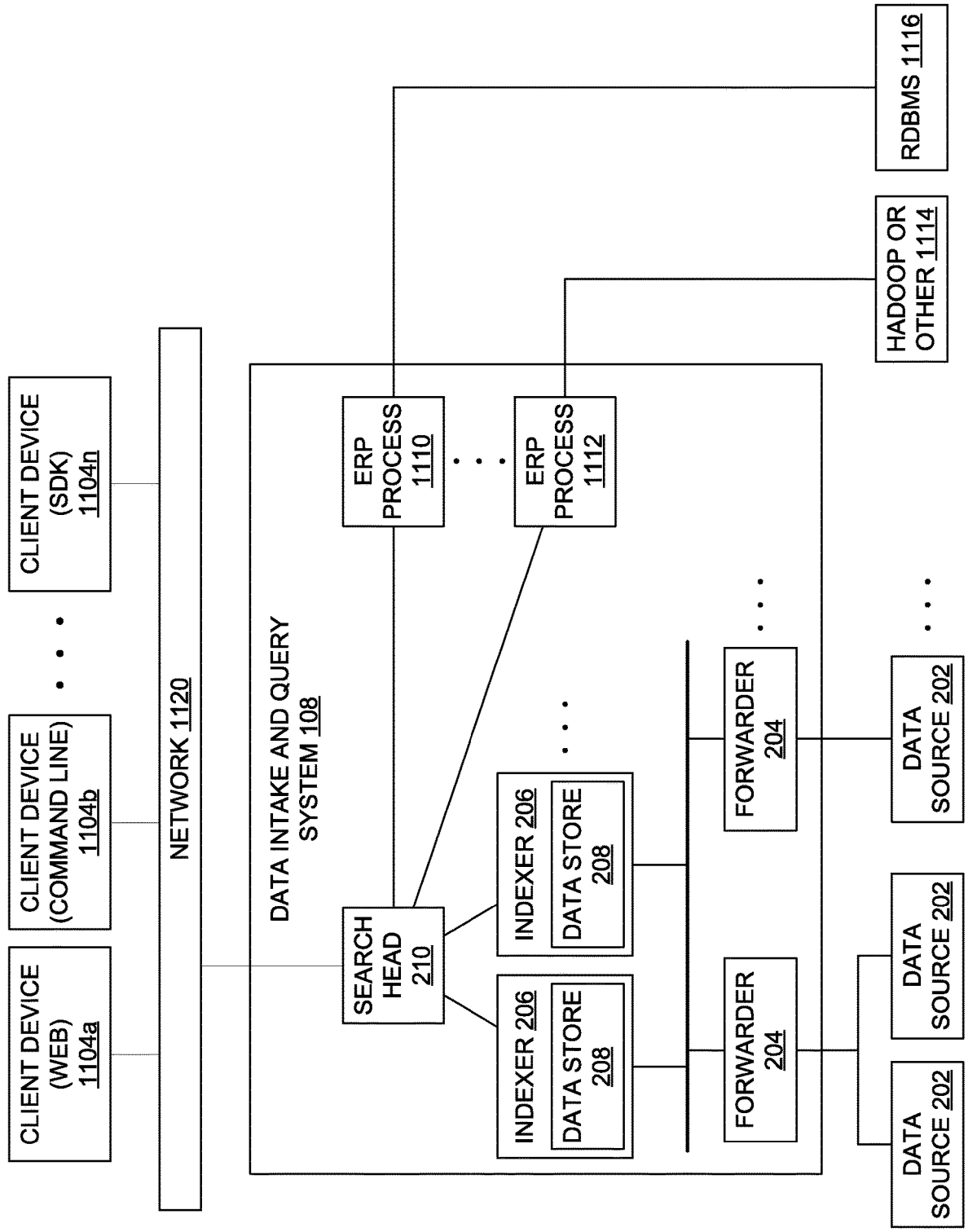
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the ]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

2.15 Cloud-Based Architecture

As shown in the previous figures, various embodiments may refer to a data intake and query system 108 that includes one or more of a search head 210, an indexer 206, and a forwarder 204. In other implementations, data intake and query system 108 may have a different architecture, but may carry out indexing and searching in a way that is indistinguishable or functionally equivalent from the perspective of the end user. For example, data intake and query system 108 may be re-architected to run in a stateless, containerized environment. In some of these embodiments, data intake and query system 108 may be run in a computing cloud provided by a third party, or provided by the operator of the data intake and query system 108. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system 108.

In some embodiments, a cloud-based data intake and query system may include an intake system. Such an intake system can include, but is not limited to an intake buffer, such as Apache Kafka® or Amazon Kinesis®, or an extensible compute layer, such as Apache Spark™ or Apache Flink®. In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system.

3.0 Overview of Facilitating Extraction Rule Enhancement and Validation in a Data Processing Environment Utilizing appropriate extraction rules is important to perform data extractions. Oftentimes, however, it is difficult to generate extraction rules that effectively extract desired data. For example, in some cases, there is a limited amount of sample data sets (e.g., events) accessible to use to generate extraction rules. As another example, varying data formats can make it difficult to capture extraction rules applicable to the various data formats. For example, even data associated with a same sourcetype may have varying data formats (e.g., different versions of vendor product, customized formats, etc.). Irrespective of sample data set size and data format variability, creating extraction rules through a user interface can be time consuming and challenging. Further, in cases in which extraction rules are not properly functioning, users typically are unsure as to how to fix the extraction rule.

Accordingly, embodiments of the present disclosure are directed to facilitating extraction rule enhancement and validation. In particular, extraction rules can be analyzed to enhance and/or validate extraction rules. In some embodiments described herein, a set of extraction rules for use in extracting data can be enhanced by utilizing user feedback pertaining to extraction rules to supplement or customize the extraction rules for subsequent use. In other embodiments described herein, an extraction rule(s) for use in extraction data can be monitored to identify whether the extraction rule is invalid. In cases that the extraction rule is deemed invalid, a new extraction rule may be generated and, thereafter, applied to extract data. Further, the newly generated extraction rule can be used to supplement or customize the extraction rules for subsequent use.

3.1 Overview of a Field Extraction System in a Data Processing Environment

Figure 18:
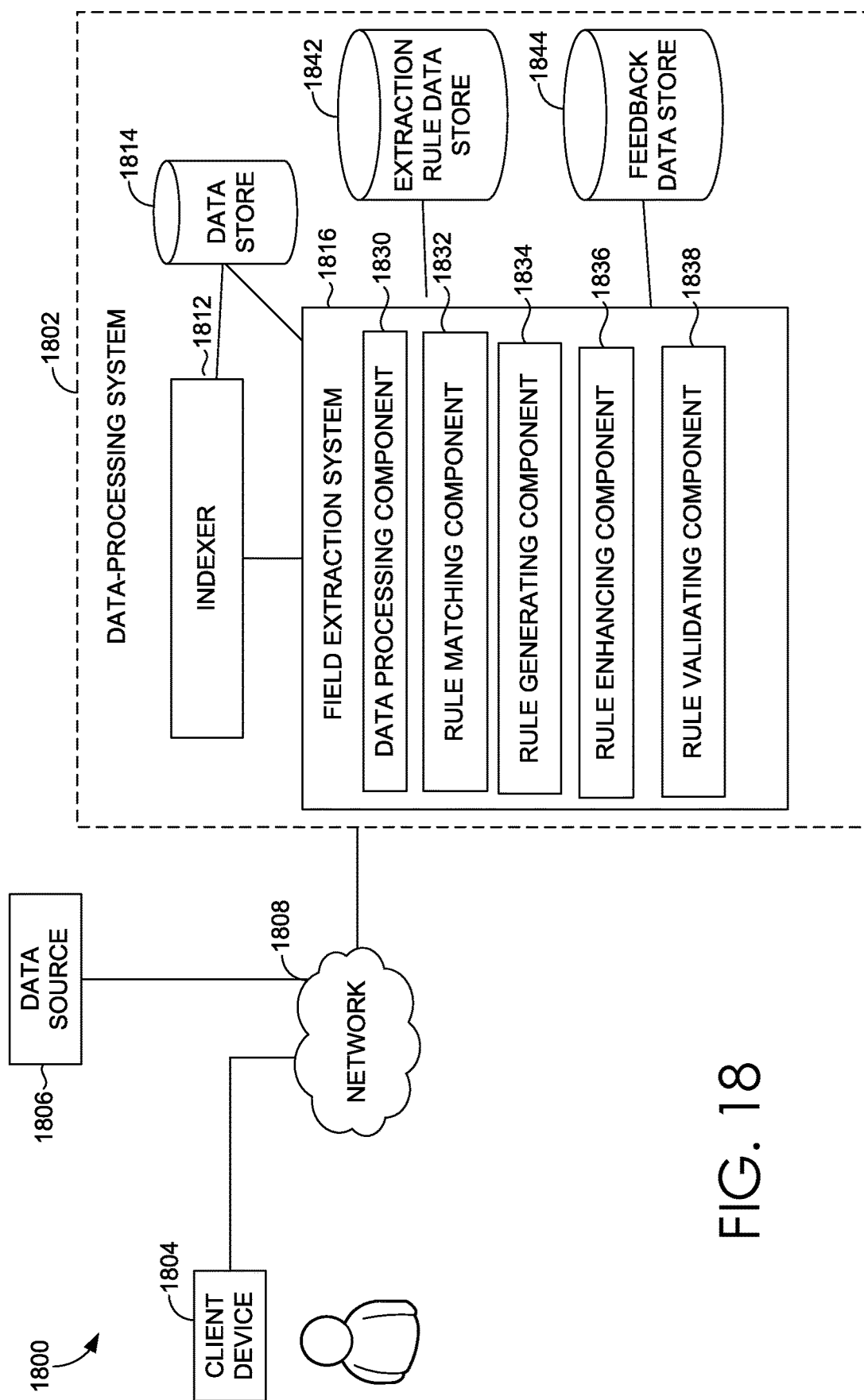
FIG. 18 depicts an example data-processing environment in accordance with various embodiments of the present disclosure.

FIG. 18 illustrates an example data-processing environment 1800 in accordance with various embodiments of the present disclosure. Generally, the data-processing environment 1800 refers to an environment that provides for, or enables, the management, storage, retrieval, preprocessing, processing, and/or analysis of data. As shown in FIG. 18, the distributed data processing environment includes a field extraction system 1816 used to facilitate enhancement and validation of extraction rules.

In some embodiments, the environment 1800 can include a data-processing system 1802 communicatively coupled to one or more client devices 1804 and one or more data sources 1806 via a communications network 1808. The network 1808 may include an element or system that facilitates communication between the entities of the environment 1800. The network 1808 may include an electronic communications network, such as the Internet, a local area network (LAN), a wide area network (WAN), a wireless local area network (WLAN), a cellular communications network, and/or the like. In some embodiments, the network 1808 can include a wired or a wireless network. In some embodiments, the network 1808 can include a single network or a combination of networks.

The data source 1806 may be a source of incoming source data being fed into the data-processing system 1802. A data source 1806 can be or include one or more external data sources, such as web servers, application servers, databases, firewalls, routers, operating systems, and software applications that execute on computer systems, mobile devices, sensors, and/or the like. Data source 1806 may be located remote from the data-processing system 1802. For example, a data source 1806 may be defined on an agent computer operating remote from the data-processing system 1802, such as on-site at a customer's location, that transmits source data to data-processing system 1802 via a communications network (e.g., network 1808).

Source data can be a stream or set of data fed to an entity of the data-processing system 1802, such as a forwarder (not shown) or an indexer. In some embodiments, the source data can be heterogeneous machine-generated data received from various data sources 1806, such as servers, databases, applications, networks, and/or the like. Source data may include, for example raw data, such as server log files, activity log files, configuration files, messages, network packet data, performance measurements, sensor measurements, and/or the like. For example, source data may include log data generated by a server during the normal course of operation (e.g. server log data).

As can be appreciated, source data might be structured data or unstructured data. Structured data has a predefined format, wherein specific data items with specific data formats reside at predefined locations in the data. For example, data contained in relational databases and spreadsheets may be structured data sets. In contrast, unstructured data does not have a predefined format. This means that unstructured data can comprise various data items having different data types that can reside at different locations.

The indexer 1812 of the data-processing system 1802 receives the source data, for example, from a forwarder (not shown) or the data source 1806, and can apportion the source data into events. An indexer 1812 may be an entity of the data-processing system 1802 that indexes data, transforming source data into events and placing the results into a data store 1814, or index. An indexer 1812 may perform other functions, such as data input and search management. In some cases, forwarders (not shown) handle data input, and forward the source data to the indexers 1812 for indexing.

During indexing, and at a high-level, the indexer 1812 can facilitate taking data from its origin in sources, such as log files and network feeds, to its transformation into searchable events that encapsulate valuable knowledge. The indexer 1812 may acquire a raw data stream (e.g., source data) from its source (e.g., data source 1806), break it into blocks (e.g., 64K blocks of data), and/or annotate each block with metadata keys. After the data has been input, the data can be parsed. This can include, for example, identifying event boundaries, identifying event timestamps (or creating them if they don't exist), applying custom metadata to incoming events, and/or the like. Accordingly, the raw data may be data broken into individual events. As discussed, an event generally refers to a portion, or a segment of the data, that is associated with a time (e.g., via a timestamp). And, the resulting events may be indexed (e.g., stored in a raw data file associated with an index file). In some embodiments, indexing the source data may include additional processing, such as compression, replication, and/or the like.

The data store 1814 may include a medium for the storage of data thereon. For example, data store 1814 may include non-transitory computer-readable medium storing data thereon that is accessible by entities of the environment 1800, such as the corresponding indexer 1812 and the field extraction system 1816. As can be appreciated, the data store 1814 may store the data (e.g., events) in any manner In some implementations, the data may include one or more indexes including one or more buckets, and the buckets may include an index file and/or raw data file (e.g., including parsed, time-stamped events). In some embodiments, each data store is managed by a given indexer that stores data to the data store and/or performs searches of the data stored on the data store. Although certain embodiments are described with regard to a single data store 1814 for purposes of illustration, embodiments may include employing multiple data stores 1814, such as a plurality of distributed data stores 1814.

As described, events within the data store 1814 may be represented by a data structure that is associated with a certain point in time and includes a portion of raw machine data (e.g., a portion of machine-generated data that has not been manipulated). An event may include, for example, a line of data that includes a time reference (e.g., a timestamp), and one or more other values. In the context of server log data, for example, an event may correspond to a log entry for a client request and include the following values: (a) a time value (e.g., including a value for the date and time of the request, such as a timestamp), and (b) a series of other values including, for example, a page value (e.g., including a value representing the page requested), an IP (Internet Protocol) value (e.g., including a value for representing the client IP address associated with the request), and an HTTP (Hypertext Transfer protocol) code value (e.g., including a value representative of an HTTP status code), and/or the like. That is, each event may be associated with one or more values. Some events may be associated with default values, such as a host value, a source value, a source type value and/or a time value. A default value may be common to some or all events of a set of source data.

In some embodiments, an event can be associated with one or more characteristics that are not represented by the data initially contained in the raw data, such as characteristics of the host, the source, and/or the source type associated with the event. In the context of server log data, for example, if an event corresponds to a log entry received from Server A, the host and the source of the event may be identified as Server A, and the source type may be determined to be "server." In some embodiments, values representative of the characteristics may be added to (or otherwise associated with) the event. In the context of server log data, for example, if an event is received from Server A, a host value (e.g., including a value representative of Server A), a source value (e.g., including a value representative of Server A), and a source type value (e.g., including a value representative of a "server") may be appended to (or otherwise associated with) the corresponding event.

In some embodiments, events can correspond to data that is generated on a regular basis and/or in response to the occurrence of a given activity. In the context of server log data, for example, a server that logs activity every second may generate a log entry every second, and the log entries may be stored as corresponding events of the source data. Similarly, a server that logs data upon the occurrence of an error may generate a log entry each time an error occurs, and the log entries may be stored as corresponding events of the source data.

Upon obtaining events, the field extraction system 1816 can facilitate the enhancement and/or validation of extraction rules relevant to the events, or portion thereof. Although the field extraction system 1816 is illustrated and described herein as a separate component, this is for illustrative purposes. As can be appreciated, the field extraction system 1816, or functions described in association therewith, can be performed at the indexer 1812, a search head, and/or any other component associated with or in communication with a data-processing system. For example, some functionality described in association with the data-processing system 1816 might be performed at a search head, while other functionality described in association with the data-processing system 1816 might be performed at an indexer. Further, the field extraction system 1816, or a portion thereof, may function in a cloud-based environment (e.g., a cloud-based data intake and query system).

As described herein, the field extraction system 1816, or portion thereof, can be initiated by a user of the client device 1804. The client device 1804 may be used or otherwise accessed by a user, such as a system administrator or a customer. A client device 1804 may include any variety of electronic devices. In some embodiments, a client device 1804 can include a device capable of communicating information via the network 1808. A client device 1804 may include one or more computer devices, such as a desktop computer, a server, a laptop computer, a tablet computer, a wearable computer device, a personal digital assistant (PDA), a smart phone, and/or the like. In some embodiments, a client device 1804 may be a client of the data-processing system 1802. In some embodiments, a client device 1804 can include various input/output (I/O) interfaces, such as a display (e.g., for displaying a graphical user interface (GUI), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 1804 can include general computing components and/or embedded systems optimized with specific components for performing specific tasks. In some embodiments, a client device 1804 can include programs/applications that can be used to generate a request for content, to provide content, to render content, and/or to send and/or receive requests to and/or from other devices via the network 1808. For example, a client device 1804 may include an Internet browser application that facilitates communication with the data-processing system 1802 via the network 1808. In some embodiments, a program, or application, of a client device 1804 can include program modules having program instructions that are executable by a computer system to perform some or all of the functionality described herein with regard to at least client device 1804. In some embodiments, a client device 1804 can include one or more computer systems similar to that of the computer system 2400 described below with regard to at least FIG. 24.

Enhancement and/or validation of extraction rules can be initiated or triggered at the client device 1804 via a graphical user interface (GUI). In some embodiments, the data-processing system 1802 can provide for the display of a GUI. Such a GUI can be displayed on a client device 1804, and can present information relating to initiating extraction rule identification, extraction rule enhancement, extraction rule analysis, or extraction rule validation; performing data extraction; and/or viewing results or alerts associated with extraction rule analysis or data extraction.

Performing extraction rule analysis to enhance and/or validate extraction rules can be initiated in any number of ways. In one implementation, extraction rule analysis can be initiated at a client device (e.g., by a user). As one example, a user may initiate extraction rule analysis prior to or in accordance with performing a search for information. For instance, an extraction rule analysis may be automatically triggered in accordance with a search being initiated in association with a query input by a user. As another example, a user may select an icon or other indicator to specifically initiate an extraction rule analysis (e.g., in association with or separate from performing a search). For example, assume a user desires to perform field extraction or enhance extraction rules. In such a case, a user may select to upload data, or events, for use in enhancing and/or validating extraction rules in association with such events.

In addition or in the alternative to performing extraction rule analysis at search time (e.g., upon the events being created, indexed, and stored), extraction rule analysis can be applied before or as events are created, indexed, and/or stored (e.g., ingest time or index time). Accordingly, extraction rule analysis as described in association with the field extraction system 1816 can additionally or alternatively be automatically performed in association with indexing or as new data is received. In this way, as data is received and/or indexed, extraction rules may be enhanced and/or validated.

The field extraction system 1816 is generally configured to facilitate enhancement and/or validation of extraction rules. In particular, the field extraction system 1816 performs extraction rule analysis to enhance and/or validate extraction rules. As described herein, an extraction rule can be applied to event data to extract values for specific fields (e.g., during indexing, search time, etc.). More specifically, an extraction rule can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule. As another example, an extraction rule may utilize delimiters, headers, patterns, or the like to provide instruction for extraction values from data in events.

As described, extraction rule analysis can be initiated or triggered in response to a query, user selection, and/or automatically. In this regard, a user may input or select (e.g., via client device 1804) a query to initiate extraction rule analysis. A query may be in any form, such as a search processing language (SPL) or a natural language form. A query may be provided to, for example, retrieve events that meet criteria specified in a query, such as containing certain keywords or having specific values in defined fields. The query can trigger the field extraction system 1816 to enhance and/or validate extraction rules. As another example, as a user inputs or uploads events, or as events are automatically ingested or indexed, extraction rule analysis may be automatically initiated.

To perform extraction rule analysis, the field extraction system 1816 may include a data processing component 1830, a rule matching component 1832, a rule generating component 1834, a rule enhancing component 1836, and a rule validating component 1838. According to embodiments of the invention, the field extraction system 1816 can include any number of other components not illustrated. In some embodiments, one or more of the illustrated components 1830, 1832, 1834, 1836, and 1838 can be integrated into a single component or can be divided into a number of different components. Components 1830-1838 can be implemented on any number of machines and can be integrated, as desired, with any number of other functionalities or services. By way of example only, any number of components of a field extraction system 1816 may operate in a cloud-based service.

The data-processing component 1830 is generally configured to perform data processing in association with a set of events, or event set. In one embodiment, the data processing component 1830 is configured to anonymize sensitive or private data within the events. Sensitive or private data to be anonymized may include, for example, IP addresses, URLs, hosts, etc. By way of example only, IP addresses within events may be identified and replaced with a default value (e.g., IPv4). In some cases, such data anonymization may occur automatically. For example, using a set of predefined anonymization rules, sensitive data may be removed or replaced within events. In other cases, data anonymization may be triggered or initiated by a user. For example, upon providing event data, a list or set of anonymization rules may be provided to a user via a graphical user interface (e.g., via client device 1804). The user may view the anonymization rules and select one or more anonymization rules desired to be applied to anonymize or remove sensitive data. Advantageously, as various implementations of this system enable multiple tenants or clients to utilize and benefit from enhanced extraction rules, anonymization enables one tenant to leverage extraction rule feedback provided by another tenant.

As can be appreciated, such data anonymization may occur separate from the field extraction system 1816, or may not occur at all. Further, the data processing component 1830 may additionally or alternatively provide other types of data processing services.

The rule matching component 1832 is configured to match a set of one or more extraction rules with events. In this regard, the rule matching component 1834 can identify extraction rules that match or correspond with events. Generally, an event matches or corresponds with an extraction rule when data (e.g., raw data) within an event includes a pattern the extraction rule uses to extract a value for a field. By way of example only, assume an extraction rule includes a pattern of N.N.NN.NNN for an IP address, where N is a number. In cases that an event includes 1.2.34.567, the extraction rule is determined to match the event. In cases that that the "N.N.NN.NNN" pattern does not exist within an event, the extraction rule does not match or correspond with the event.

Extraction rules may be stored in extraction rule data store 1842. As such, the rule matching component 1832 may reference extraction rules stored in extraction rule data store 1842 and analyze such extraction rules to identify one or more extraction rules that correspond with or match an event set.

In some cases, the rule matching component 1832 may match events with a rule package. A rule package generally refers to a particular set of extraction rules. Generally, the extraction rules included in a rule package are related to one another in some manner. For example, a rule package can include a set of extraction rules associated with a particular sourcetype. In this regard, a first rule package may correspond with a first source type, and a second rule package may correspond with a second source type. Each rule package may have various extraction rules, for example, due to different log formats or vendor versions.

Rule packages can be stored in an extraction rule data store, for example, within extraction rule data store 1842. Accordingly, the rule matching component 1832 can access rule packages within an extraction rule data store and analyze the extraction rules to identify a rule package having extraction rules that correspond with the particular events.

Identifying a set of one or more extraction rules (e.g., a rule package) that match or correspond with a set of events can occur in any number of ways. In one implementation, the rule matching component 1832 may determine match rates associated with one or more extraction rules or rule packages. A match rate indicates an extent, proportion, percentage, or rate at which an extraction rule(s) (e.g., rule package) corresponds with events. In particular, for instance, a match rate for a rule package can indicate an extent, proportion, percentage, or rate at which at least one extraction rule of a rule package corresponds with or matches with events. By way of example only, an 88% match rate associated with a first rule package indicates that at least one extraction rule in a first rule package matches or corresponds with 88% of events within a set of events. Typically, an event will match only one extraction rule in a particular rule set, but that is not always the case. As can be appreciated, in some cases, a match rate may be determined in association with each extraction rule, each rule package, or portions thereof. Accordingly, each extraction rule or rule package may be analyzed in light of a set of events to determine a match rate for the corresponding rule or rule package.

The determined match rates can then be used to determine one or more extraction rules that match an event set. For example, rule packages associated with a match rate above a threshold value (e.g., 30%, 50%, 80%, etc.) may be considered a match with an event set. As another example, rule packages associated with a predetermined number (e.g., 1, 3, etc.) of highest match rates may be deemed a match with an event set. As yet another example, a maximum number of rule packages (e.g., 3) associated with the highest match rates and exceeding a threshold value may be deemed a match with an event set.

Advantageously, the match rates associated with rule packages can be used to infer sourcetype associated with the events. In this regard, in cases that a rule package corresponds with a particular sourcetype, when a set of events are determined to match a particular rule package, it can be inferred that the events are associated with the corresponding sourcetype. As described, a source type generally refers to a type of source associated with a data set (e.g., source from which the data is obtained or at which the data is collected). For instance, a first data set may be provided via a first source type of a router, while a second data set may be provided via a second source type of a mobile device. Example source types include access_combined, cisco_syslog, apache_error, websphere_core, Linux, other log formats, etc.

Inferring a sourcetype can be valuable for any number of reasons, such as, for example, enabling verification of utilization of a correct rule package, tagging the event(s) as the sourcetype (e.g., when an event does not already have a corresponding sourcetype), etc. The "sourcetype" field enables categorization of data for improved searching. For instance, a source type indicator can be used in searches to find data of a certain type. In some cases, a sourcetype can be automatically assigned to events in accordance with identification of a matching rule package. For instance, the field extraction system 1816 may identify and add a sourcetype field when it identifies a rule package with a highest match rate. As a result, an event can include a "sourcetype" field.

As can be appreciated, the rule matching component 1832 can also be configured to extract values using a set of one or more extraction rules (e.g., matched extraction rules). A set of extraction rules to apply to an event set may be determined in any number of ways. In some cases, as discussed above, the rule matching component 1832 may be utilized to determine a set of extraction rules (e.g., rule package) to use in association with an event set. For example, the events may be compared to various extraction rules to select a most appropriate extraction rule(s) to use for extraction (e.g., extraction rule with a highest match rate). In other cases, a set of extraction rules and corresponding match rates may be provided to the user for selection of an extraction rule(s) to apply to an event set. In yet other cases, a user may input a set of extraction rules desired for use in performing data extraction. Upon obtaining or identifying an extraction rule(s) for performing data extraction, the extraction rule(s) can be applied to a set of events to extract data or fields. Thereafter, in some cases, a match rate can be determined (e.g., how many events do not match any extraction rules or how many rules do not match any events). Matching and/or extracting performed by the rule matching component 1832 may be triggered based on an input of a set of events for which field extraction is desired.

The rule generating component 1834 is generally configured to generate extraction rules, for example for particular events. In this regard, the rule generating component 1834 can generate new extraction rules, or rule packages having extraction rules, that match or correspond with events. In some cases, the rule generating component 1834 can be used to generate new rules when existing extraction rules (e.g., rule packages) are not deemed to match a set of events. For example, an existing rule package may not be deemed to match an event set if a match rate does not exist above a threshold value (e.g., 50%). In such a case, rule generating component 1834 may generate extraction rules applicable to the particular events. In other cases, the rule generating component 1834 may generate rules even when existing extraction rules (e.g., a rule package) are deemed to match a set of events. For example, in some cases, upon identifying matches via the rule matching component 1832, the user may select to preview one of the matched rule packages (e.g., with the highest match rate inferring sourctype) and also select to generate additional extraction rules for the events. In yet other cases, the rule generating component 1834 can be used to generate new rules when existing extraction rules are invalid or deficient. For instance, when extraction rules do not match any of the events within a particular time frame (e.g., five minutes), the rule generating component 1834 may generate extraction rules corresponding to the events.

The rule generating component 1834 can generate extraction rules in any number of ways. As one example, extraction rules may be generated based on analysis of the event set. By way of example only, extraction rules may be generated by detecting events formats (e.g., JSON, SML, Tabular, Key-value, unstructured, etc.), performing automatic field discovery, and clustering events by machine learning algorithms. More details of methods that can be used to generate extraction rules can be found in US Publication Nos. 2017/0286038 and 2017/0286455, which are hereby incorporated by reference. Irrespective of how extraction rules are generated, such newly generated extraction rules can be stored in the extraction rule data store 1842 for subsequent use. Accordingly, such newly generated extraction rules enhance the available extraction rules and, as described in more detail below, can be further improved in accordance with feedback from users.

The rule enhancing component 1836 is generally configured to enhance extraction rules. In particular, the rule enhancing component 1836 facilitates obtaining extraction rule feedback and using such feedback to enhance extraction rules for subsequent use. In this way, the rule enhancing component 1836 enables enhancement of extraction rules based on user feedback, and in some cases, feedback across various tenants of the data-processing system 1802.

The rule enhancing component 1836 may obtain user feedback via a graphical user interface presented to a user (e.g., via client device 1804). Generally, extraction rules can be previewed to enable user feedback. Extraction rule preview may be initiated in any number of ways. As one example, upon determining rule packages that match an event set and/or generation of an extraction rule(s), the rule enhancing component 1836 can provide the matched extraction rules and corresponding match rates to a user via a graphical user interface. In accordance with presenting extraction rules (e.g., rule packages) and corresponding matching rates, a user may select a particular set of extraction rules (e.g., rule package) for which to preview. For example, a user may select a rule package associated with a highest match rate. As another example, a set of extraction rules may be previewed based on automatic selection of extraction rules (e.g., a rule package with a highest matching score may be automatically previewed).

In providing an extraction rule preview, various types of information may be provided. For example, a set of extraction rules may be provided (e.g., a set of extraction rules of a selected rule package). Events may also be provided for presentation. For example, in some cases, all events of the event set may be provided. In other cases, events matching or corresponding with a particular extraction rule or the rule package may be presented. In some cases, the values extracted, or to be extracted, from the events may be visually emphasized (e.g., highlighted) within the events. Summary information may also be provided within a preview. For instance, number of fields, event match rate, number of extractions, number of distinct values, etc. may be determined and presented to a user.

A user may provide various types of feedback pertaining to the extraction rule preview. By way of example only, feedback may include extraction rule customization, field name editing, or the like. For instance, a user may update a "field 1" name to "host." The feedback provided by a user(s) can be used to enhance extraction rules for subsequent use. For example, continuing with the example of the "field 1" name being updated to "host." When such feedback is captured, upon detecting a subsequent similar pattern (e.g., a value before an IP address), a determination can be made to change the field name to "host."

In some cases, in addition to providing direct user feedback (e.g., user modifications), additional context may be captured and used to enhance extraction rules. Context may refer to any information associated with a user-provided feedback. For example, assume a user modifies a field name. In such a case, feedback context may include a time associated with the field name modification, position of the field, data or values within a range or distance from the field name modification (e.g., values in the two previous fields and two following fields), field names within a range or distance from the field name modification (e.g., field names in the two previous fields and two following fields), or the like.

Feedback and corresponding context can be provided to a feedback data store, such as feedback data store 1844. The recorded feedback and context can be used to enhance or refine extraction rules. In this way, as users may not know how to customize extraction rules for a set of events, the captured feedback and context can be used to facilitate knowledge transfer to other users. For instance, one user can utilize knowledge provided by another user with regard to extraction rules for the same sourcetype.

The rule enhancing component 1836 can use feedback and corresponding context in any number of ways to enhance extraction rules (e.g., rule package). As one example, machine learning can use feedback and/or feedback context to reorder, remove, and/or refine extraction rules that can then be subsequently used to perform data extraction. This can be performed in any number of ways. By way of example, feedback can be normalized and similar feedback grouped or clustered. For instance, assume one feedback is to rename a field from "number" to "port" after "ipv4/." Assume another feedback is to rename a field from "number" to "port" after "ipv4:." These two sets of similar feedback can be merged into one feedback. Thereafter, feedbacks can be ordered by corresponding weights, such as how many different users have provided the same feedbacks, the frequencies of feedbacks, etc. Further, metadata can be leveraged to adjust weights (e.g., authorized users can have higher weights). For instance, a user known to be an administrator, developer, or data scientist associated with a particular entity(s), corresponding user feedback may have significantly higher weights than feedback provided by other users. Feedbacks and associated weights can be provided for viewing, for instance, within the extraction rules preview page. A user may then be able to select a preference or use a default (e.g., with a highest weight).

The rule validating component 1838 is configured to validate whether extraction rules selected or identified for data extraction are valid or invalid. A valid extraction rule refers to an extraction rule that operates to extract values or fields. On the other hand, an invalid extraction rule refers to an extraction rule that fails to extract values or fields.

In validating extraction rules in association with performing data extraction, the rule validating component 1838 can monitor if an extraction rule(s) being applied to a set of events is effectively extracting values. Extraction rule validation can be performed in any number of ways. As one example, a set of one or more extraction rules (e.g., a particular extraction rule) may be deemed invalid or ineffective when a threshold number of events within an event set do not match or correspond with any extraction rule. As another example, a set of extraction rules may be deemed invalid or ineffective when a threshold number of events within an event set do not match or correspond with any extraction rule within a particular amount of time (e.g., 5 minutes). As another example, an extraction rule may be deemed invalid when the extraction rule matches no events or a less ratio of events than before. For instance, assume that in last seven days, one rule matches 20% events, but only matches 5% in last 1 hour. In such a case, the rule can be determined to be invalid (e.g., can assume some sample formats changed) and an alert can be sent to an administrator. The administrator can decide if the extraction rule is as designed (removed one appliance from ENV), or whether the extraction rule should be fixed. As can be appreciated, in some implementations, the administrator can set a threshold (match ratio degradation>5%) or monitor time range (daily or hourly) to trigger the alert.

In cases that the rule validating component 1838 detects a particular set of extraction rules being applied to an event set is invalid or ineffective, the rule validating component 1838 may initiate generation of extraction rules, for example, based on the events. To this end, the rule generating component 1834 may be initiated to generate new extraction rules that can be applied to the event set. Such newly generated extraction rules can be stored in the extraction rule data store 1842 for subsequent use.

In some cases, upon detecting an invalid or deficient set of extraction rules, an alert may be provided via a graphical user interface to alert or notify a user of the invalid extraction rules. In this way, upon recognizing the alert or notification, a user may select to initiate the generation of new extraction rules. Such new extraction rules can be stored in extraction rule data store 1842.

As can be appreciated, the data-processing system 1802, or portions thereof, can be used in accordance with various workflows to perform different functionality. As one example, the data processing system 1802 can operate to enhance extraction rules via a build-time workflow, which is described in more detail below. Generally, the build-time workflow is implemented or used at instances during which extraction rules are being generated and enhanced for subsequent use. As another example, the data processing system 1802 can operate to validate extraction rules via a run-time workflow, which is described in more detail below. Generally, the run-time workflow is implemented or used at instances during which field extraction is initiated.

3.2 Extraction Rule Enhancement Via Build-Time Implementation

As previously described, extraction rules, particularly customized extraction rules, can be difficult to construct with an insufficient set of events to reference. Further, user interfaces can be difficult and time consuming to operate to create extraction rules. Accordingly, embodiments describe herein are directed to an efficient and effective manner of enhancing extraction rules. Generally, and at a high-level, feedback or knowledge pertaining to extraction rules can be accumulated and used to improve or enhance the set of extraction rules stored or accessible for subsequent use.

Figure 19:
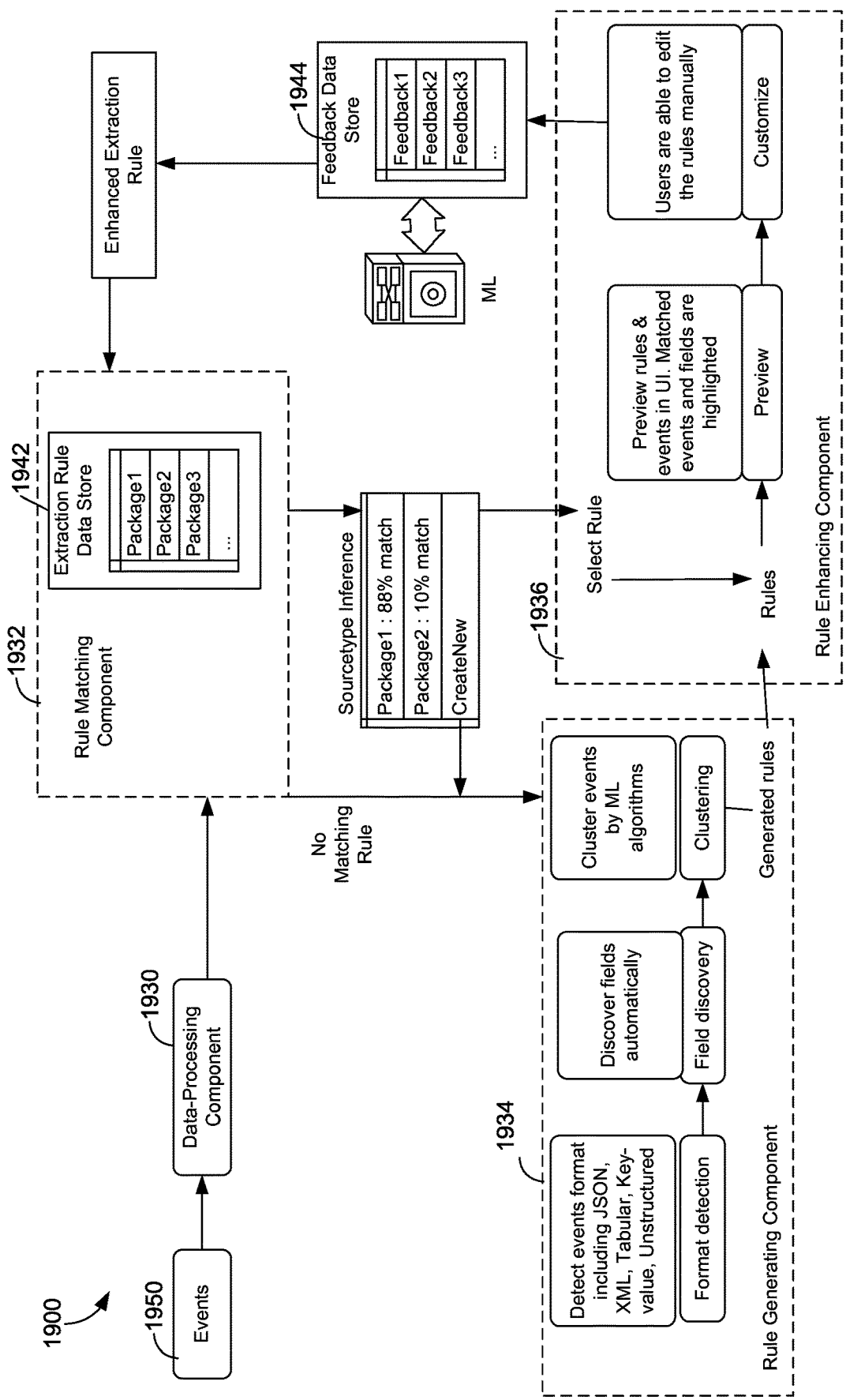
FIG. 19 provides an illustrative implementation of performing extraction rule enhancement, in accordance with embodiments of the present disclosure.

FIG. 19 provides an illustrative implementation 1900 of performing extraction rule enhancement. Implementation 1900 can be used to generate and build extraction rules that can be subsequently used for performing data extraction. Such an implementation or workflow may be referred to herein as a build-time implementation or workflow. As shown, the build-time implementation 1900 can include a data-processing component 1930, a rule matching component 1932, a rule generating component 1934, and a rule enhancing component 1936. Such components may be similar to the corresponding components discussed in reference to FIG. 18.

As illustrated in FIG. 19, events 1950 can be input into a data-processing component 1930. The events can generally be any set of events. In some cases, the events are events input into data-processing component 1930 at ingest or index time. The data processing component 1930 can anonymize data within the events. In one embodiment, the data processing component 1930 is configured to anonymize sensitive or private data within the events. For example, using a set of predefined anonymization rules, sensitive data may be removed or replaced (e.g., with a default value) within events.

The anonymized events can be input into the rule matching component 1932. As shown, the rule matching component 1932 can include or have access to an extraction rule data store 1942 that includes a set of rule packages. The rule matching component 1932 can identify one or more rule packages that correspond with or match the events. As previously described, a rule package generally refers to a particular set of extraction rules related in some manner (e.g., associated with a same sourcetype). To this end, the rule matching component 1932 matches one or more rule packages with events. As such, the rule matching component 1932 may reference rule packages stored in extraction rule data store 1942 and analyze extraction rules within the rule packages to identify one or more rule packages that correspond with or match an event set.

Identifying a set of rule packages that match or correspond with a set of events can occur in any number of ways. In one implementation, the rule matching component 1932 may determine match rates associated with one or more rule packages (e.g., each rule package in the set of rule packages). A match rate for a rule package indicates an extent, proportion, percentage, or rate at which at least one extraction rule of a rule package corresponds with, or matches, the events. For example, an 88% match rate associated with a first rule package indicates that at least one extraction rule in a first rule package matches or corresponds with 88% events within a set of events. Accordingly, each rule package may be analyzed in light of a set of events to determine a match rate for the corresponding rule package.

The match rates determined by the rule matching component 1932 can then be used to determine one or more extraction rules that match an event set. For example, rule packages associated with a match rate above a threshold value (e.g., 30%, 50%, 80%, etc.) may be considered a match with an event set. As another example, rule packages associated with a predetermined number (e.g., 1, 3, etc.) of highest match rates may be deemed a match with an event set. As yet another example, a maximum number of rule packages (e.g., 3) associated with the highest match rates and exceeding a threshold value may be deemed a match with an event set. Rule packages deemed to match an event set, and corresponding match rates, can be provided to the rule enhancing component 1934 for communication to a user, via a graphical user interface. In some cases, each extraction rule or rule package may be deemed a match.

In the event a rule package is not deemed matching, the rule generating component 1934 can generate an extraction rule(s) applicable to the event set. In some cases, a rule generating component may be used to generate rules even in the event a matching extraction rule is identified. The rule generating component 1934 can generate extraction rules in any number of ways. As one example, extraction rules may be generated based on analysis of the event set. Irrespective of how extraction rules are generated, such newly generated extraction rules can be stored in the extraction rule data store 1942 for subsequent use.

The rule packages identified as matching the events (e.g., via the rule matching component 1932) and/or new generated extraction rules (e.g., via the rule generating component 1934) can be provided to the rule enhancing component 1936. The rule enhancing component 1936 is generally configured to enhance extraction rules. In particular, the rule enhancing component 1936 facilitates obtaining extraction rule feedback and using such feedback to enhance extraction rules for subsequent use. In this way, the rule enhancing component 1936 enables enhancement of extraction rules based on user feedback, and in some cases, feedback across various tenants of a data-processing system.

The rule enhancing component 1936 may obtain user feedback via a graphical user interface presented to a user. Generally, extraction rules can be previewed to enable user feedback. Extraction rule preview may be initiated in any number of ways. As one example, upon determining rule packages that match an event set and/or generation of an extraction rule(s), the rule enhancing component 1936 can provide the matched extraction rules and corresponding match rates and/or newly generated extraction rules (and, in some cases, corresponding match rates) to a user via a graphical user interface. In accordance with presenting rule packages and/or extraction rules and corresponding matching rates, a user may select a particular set of extraction rules (e.g., rule package) for which to preview. For example, a user may select a rule package associated with a highest match rate. As another example, a set of extraction rules may be previewed based on automatic selection of extraction rules (e.g., a rule package with a highest matching score may be automatically previewed).

In providing an extraction rule preview, various types of information may be provided. For example, a set of extraction rules of a selected rule package may be provided. Additionally, events matching or corresponding with the selected rule package may be presented. In some cases, the values extracted, or to be extracted, from the events may be visually emphasized (e.g., highlighted) within the events. Summary information may also be provided within a preview. For instance, number of fields, event match rate, number of extractions, number of distinct values, etc. may be determined and presented to a user.

The rule enhancing component 1936 may obtain various types of feedback pertaining to the extraction rule preview (e.g., provided via a user). By way of example only, feedback may include extraction rule customization, field name editing, or the like. For instance, a user may update a "field 1" name to "host." The feedback provided by a user(s) can be used to enhance extraction rules for subsequent use. In some cases, in addition to obtaining direct user feedback (e.g., user modifications), additional context may be obtained or identified via the rule enhancing component 1936 and used to enhance extraction rules. As described, context may refer to any information associated with a user-provided feedback. For example, assume a user modifies a field name. In such a case, feedback context may include a time associated with the field name modification, position of the field, data or values within a range or distance from the field name modification (e.g., values in the two previous fields and two following fields), field names within a range or distance from the field name modification (e.g., field names in the two previous fields and two following fields).

Feedback and corresponding context can be stored in feedback data store 1944. The recorded feedback and context can be used to enhance or refine extraction rules. In this way, the rule enhancing component 1936 can utilize the captured feedback and context to enhance extraction rules, thereby facilitating knowledge transfer for subsequent use (e.g., by other users). The rule enhancing component 1936 can use feedback and corresponding context in any number of ways to enhance extraction rules (e.g., rule package). As one example, machine learning can be used to reorder, remove, and/or refine extraction rules that can then be subsequently used to perform data extraction.

The enhanced extraction rules can be stored in the extraction rule data store 1942. As such, the enhanced extraction rules in the extraction rule data store 1942 can be used as a basis for further enhancement, for example, upon analyzing a different event set. As can be appreciated, the enhanced extraction rules can additionally or alternatively be accessed and used to perform data extraction. In this way, users can benefit from the enhanced extraction rule to appropriately extract fields from events.

Figure 20A:
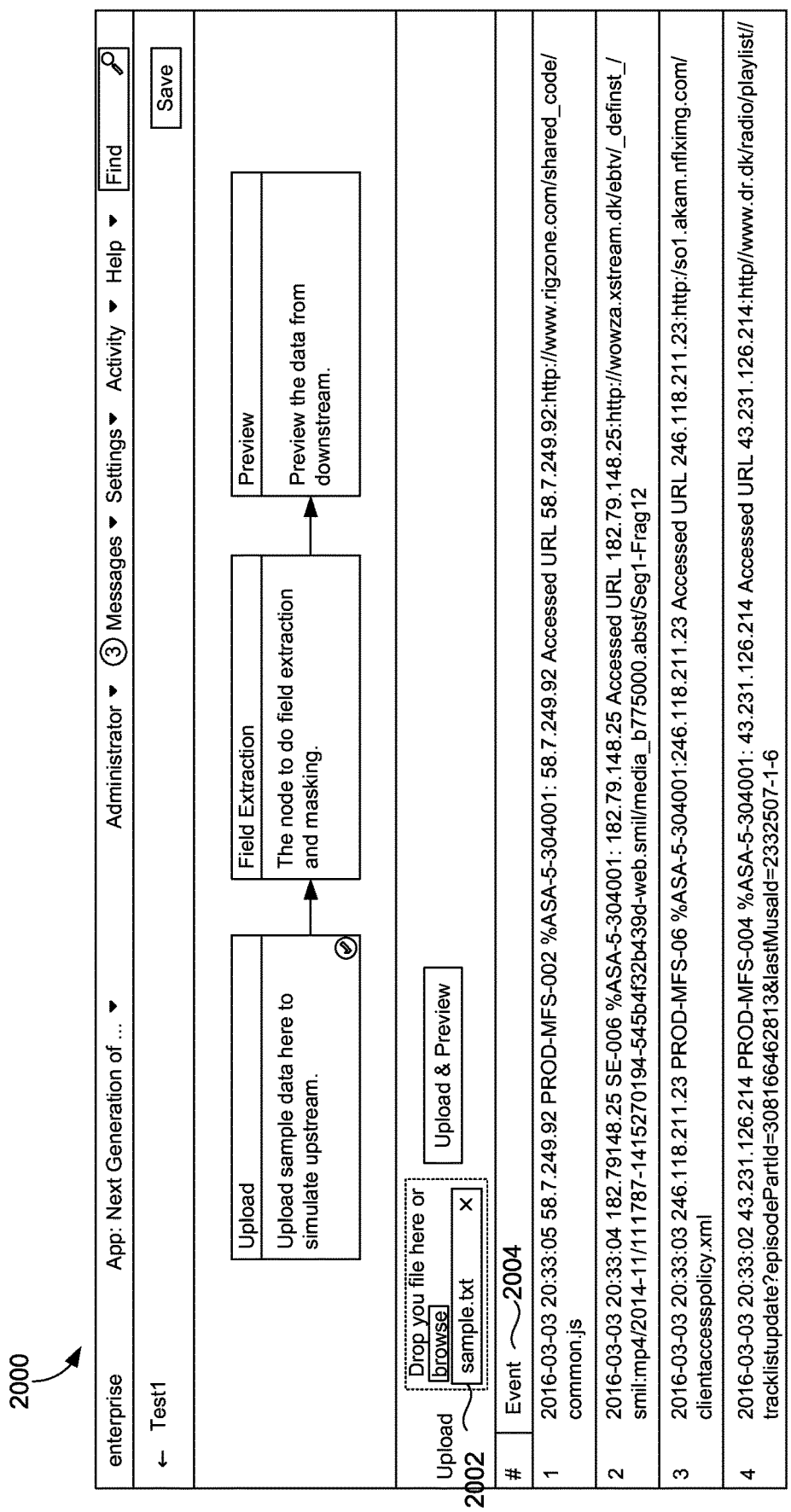

In accordance with implementations described herein, FIGS. 20A-20H depict illustrative user interfaces that may be used to facilitate enhancement of extraction rules. As described, a user can interact with such interfaces via various input or interaction mechanisms. Beginning with FIG. 20A, FIG. 20A depicts an example user interface for initiating extraction rule enhancement. In particular, as shown in user interface 2000, a user may select to upload sample data or events 2002 titled "sample.txt." In accordance with selecting a set of events, the events 2004 can be presented.

Figure 20B:
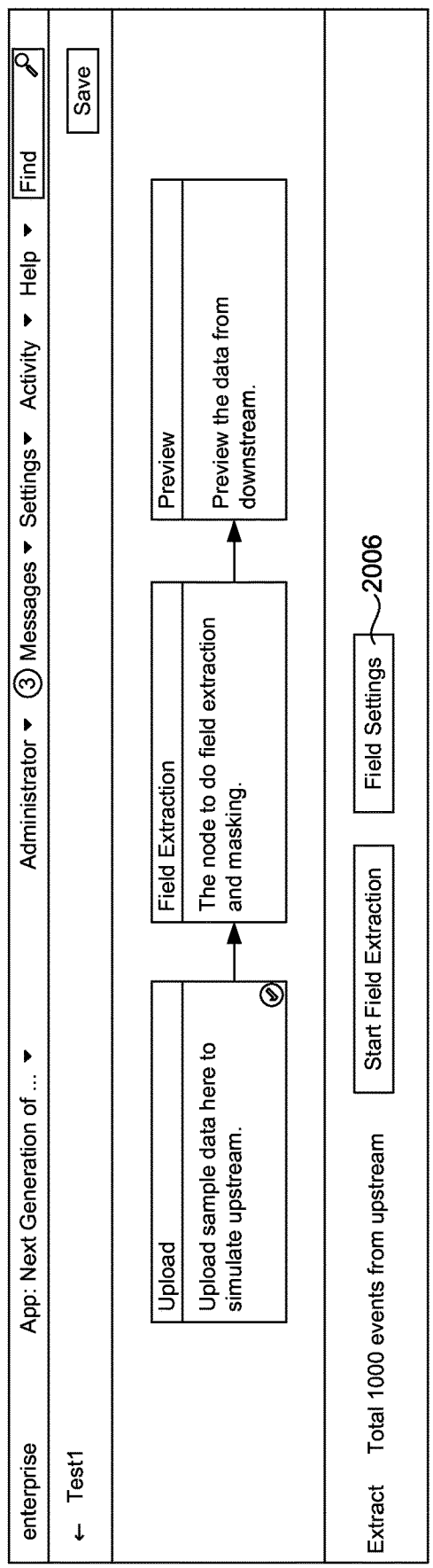
Figure 20E:
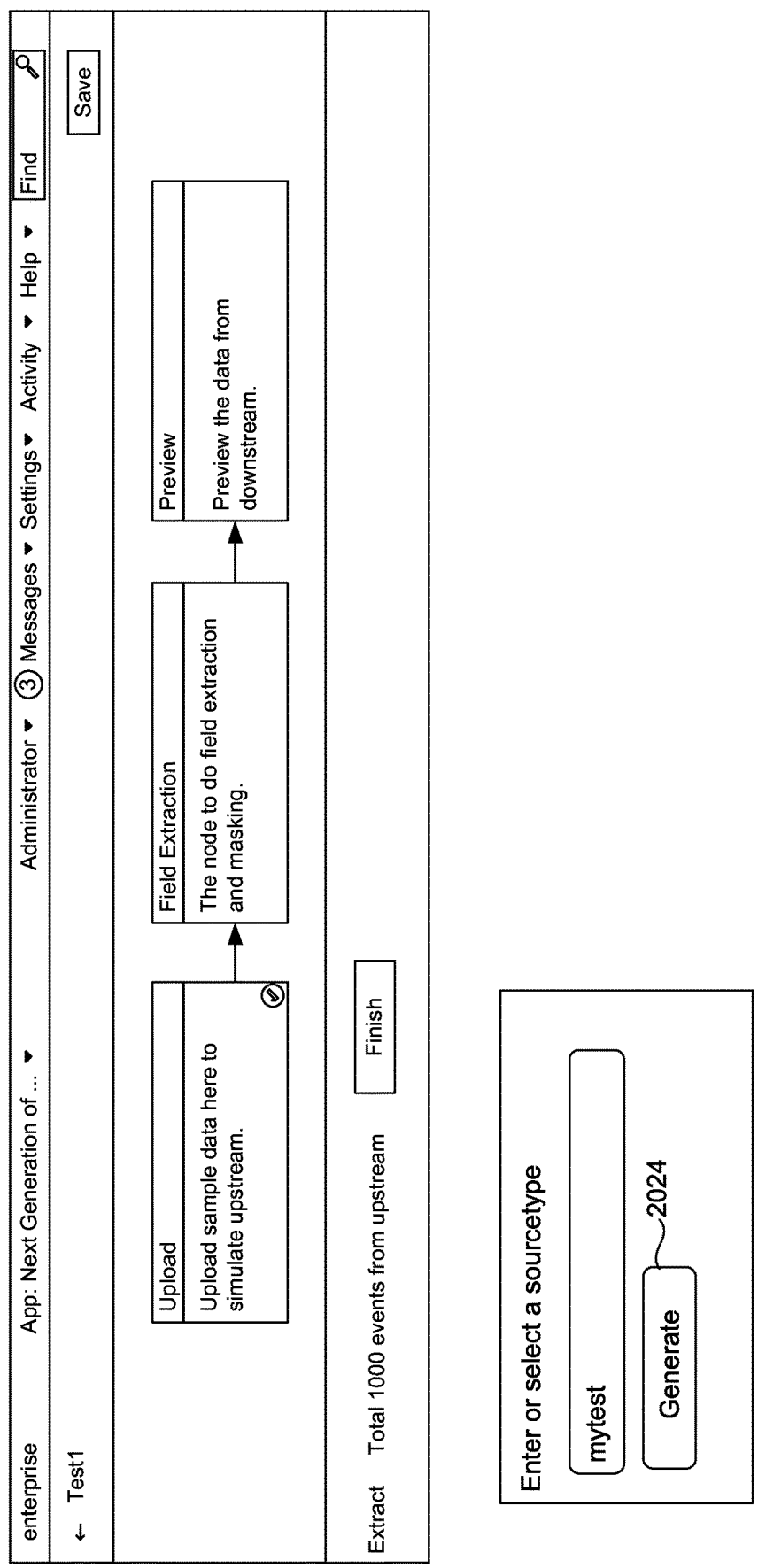

Upon selecting data or events for which to enhance extraction rules, a user may select field settings icon 2006 of FIG. 20B to initiate data anonymization. In some cases, upon selecting to anonymize data, anonymization may automatically occur, for example, using default anonymization rules. In other embodiments, a user interface 2008 of FIG. 20C may be utilized to select anonymization options, such as specific anonymization rules to apply. For example, a list of anonymization rules 2010 can be presented for a user to view, edit, and/or apply to the events. Anonymization rules 2100 can be stored, for example, in association with extraction rule data store (e.g., extraction rule data store 1842). Advantageously, and by way of example, a customized anonymization rule to anonymize IPv6 can be accessed and leveraged to discover fields (e.g., via a rule generating component 1834).

Upon anonymizing data, the events can be analyzed in light of various rule packages to determine match rates associated with the rule packages. Thereafter, a user can be presented with rule packages and corresponding match rates. As shown in FIG. 20D, an indication of a first rule package 2012 and corresponding match rate 2014, an indication of a second rule package 2016 and corresponding match rate 2018, and an indication of a third rule package 2020 and corresponding match rate 2022 are presented. In cases that rule packages are associated with a sourcetype, in some embodiments, the sourcetype may be presented as the indication of the rule package, as illustrated in FIG. 20D. A user may select one of the rule packages, or sourcetypes, to preview. Alternatively or additionally to a user selecting a rule package for preview, a user may select to generate extraction rules via generate icon 2024 of FIG. 20E.

Figure 20F:
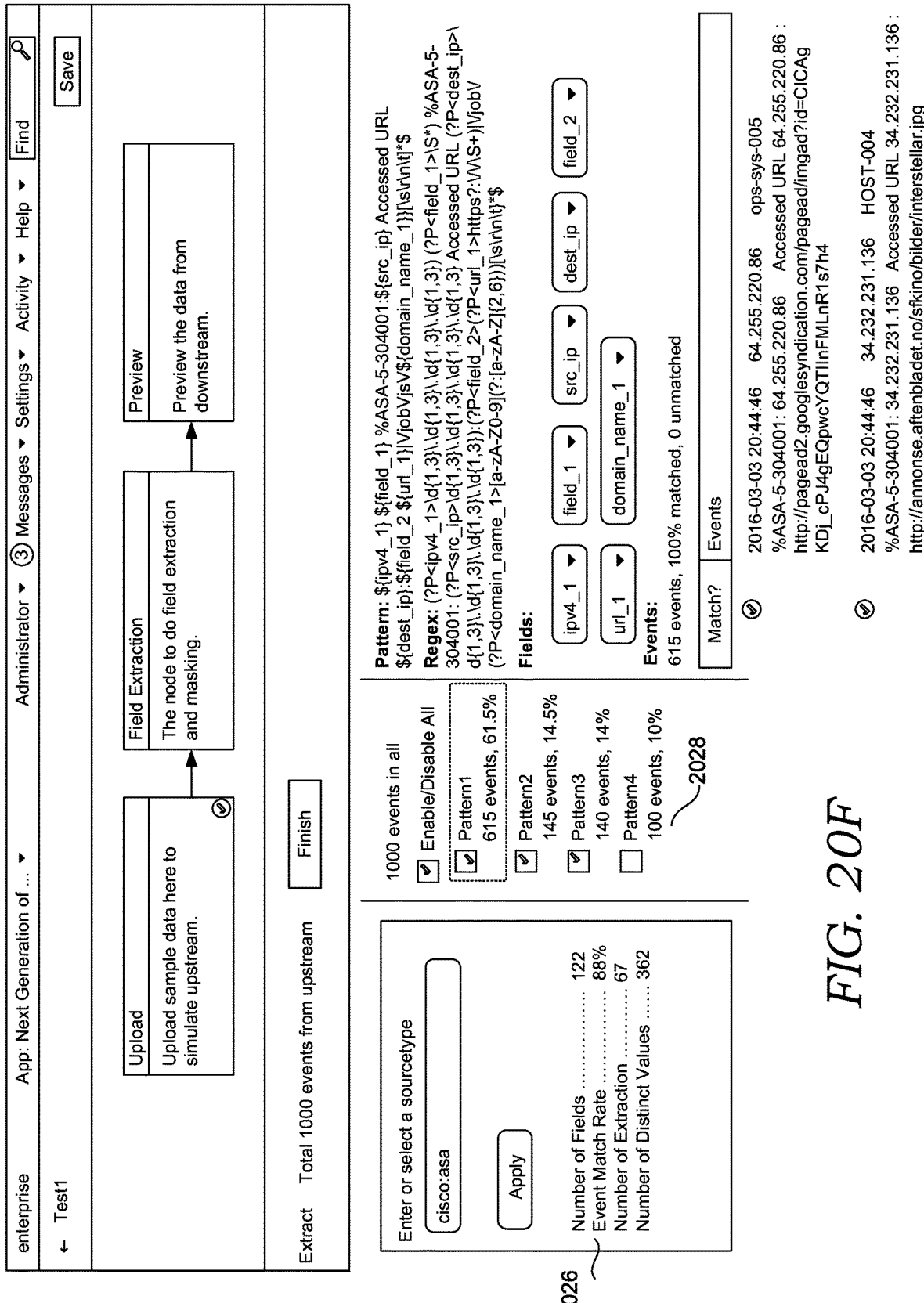

A preview of a set of extraction rules can be presented to a user. For example, assume a user selects the first rule package 2012 of FIG. 20D for preview. In such a case, a preview of the extraction rules can be provided, as illustrated in FIG. 20F. As shown, a summary portion 2026 may be presented with various types of information, such as number of fields, event match rate, number of extractions, and number of distinct values. An extraction rule portion 2028 provides indications of the extraction rules of the selected rule package. For example, extraction rule portion 2028 includes a first extraction rule that is applicable to 615 events of a total 1000 events, a second extraction rule that is applicable to 145 events, a third extraction rule that is applicable to 140 events, and a fourth extraction rule that is applicable to 100 events. Each extraction rule can be selected to present corresponding data. For example, if the first extraction rule is selected, information associated therewith can be presented (e.g., extraction rule, fields, events, or the like).

Figure 20G:
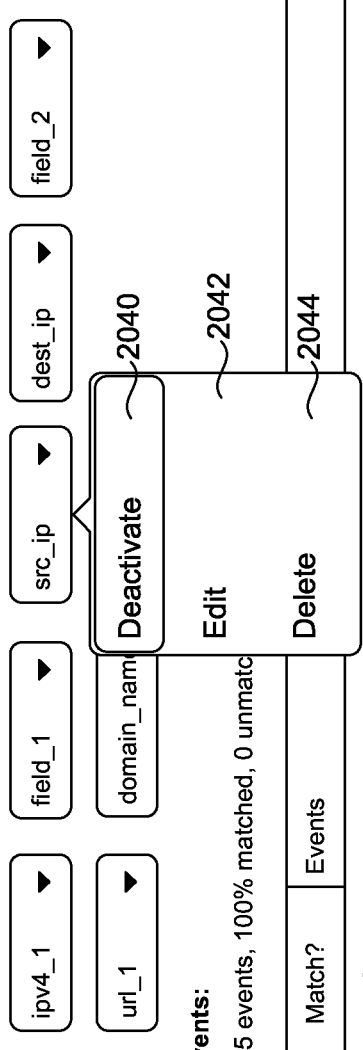
Figure 20H:
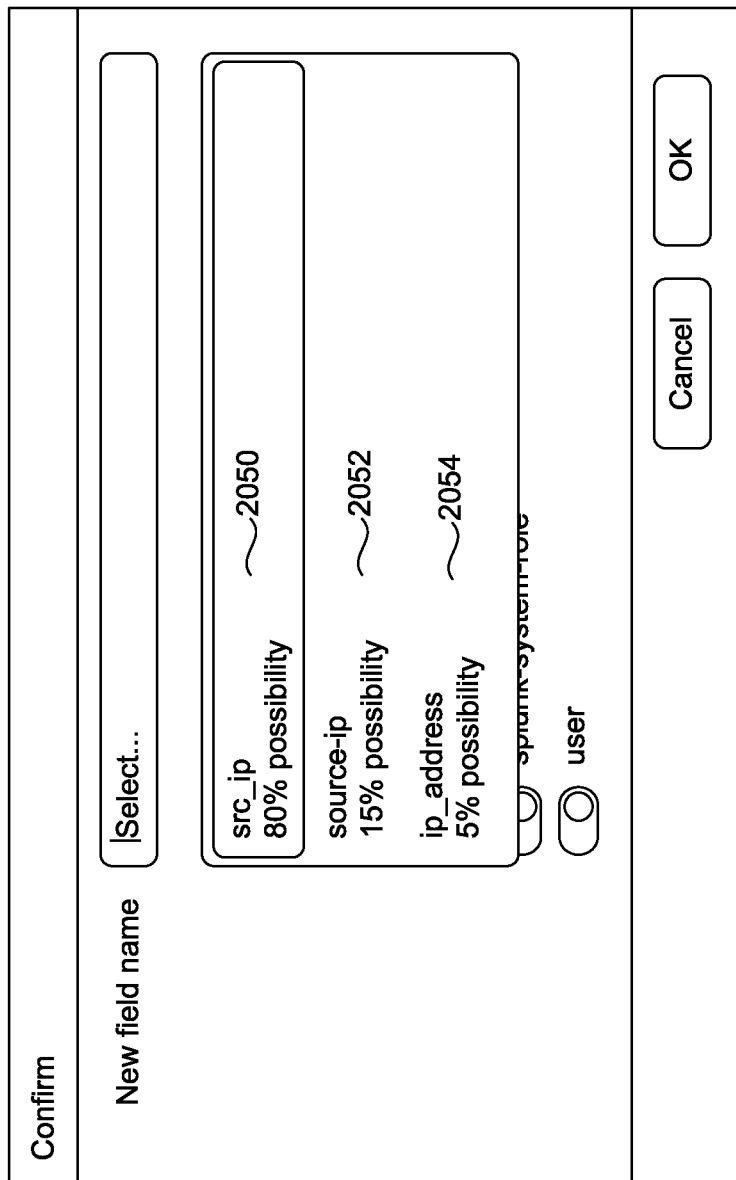

In accordance with previewing a set of extraction rules, a user may provide feedback in relation to the extraction rule(s). For example, as illustrated in FIG. 20G, a user may select to deactivate 2040, edit 2042, or delete 2044 a field or field name. A user may also select to obtain recommendations, such as new field name recommendations. For instance, in FIG. 20H, field name recommendation 2050, field name recommendation 2052, and field name recommendation 2054 can be provided as recommendations. A user may select one of the name recommendations to modify a field name and provide feedback for enhancing extraction rules.

Figure 21:
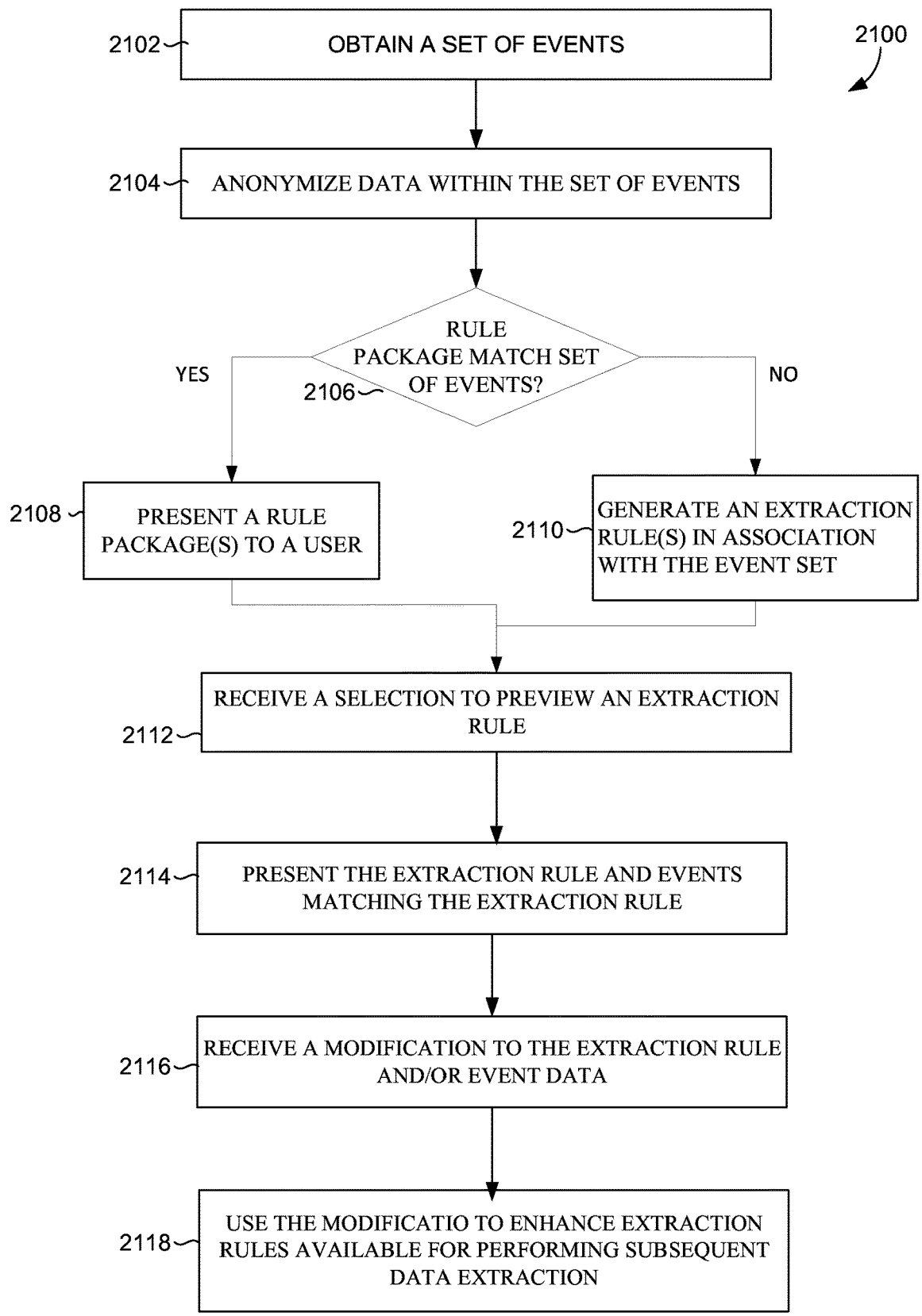
FIG. 21 illustrates a method of enhancing extraction rules, in accordance with embodiments of the present invention, according to embodiments of the present invention.

Turning to FIG. 21, FIG. 21 illustrates a method 2100 of enhancing extraction rules, in accordance with embodiments of the present invention. As can be appreciated, additional or alternative steps may also be included in different embodiments. Such a method 2100 may be performed, for example, at a field extraction system, such as field extraction system 1816 of FIG. 18.

Initially, at block 2102, a set of events is obtained. Such a set of events may be obtained, for example, at ingest time, index time, or search time. Data within the set of events can be anonymized, as shown at block 2104. At block 2106, a determination is made as to whether a rule package matches the set of events. As described, such a determination may occur in any number of ways, such as whether an extent of which at least one extraction rule in a rule package matches the event set exceeds a threshold. If so, a rule package, or set of rule packages, can be presented to a user, as indicated at block 2108. In some cases, the rule package(s) may be presented with the corresponding match rate. On the other hand, if it is determined that a rule package does not match the set of events, at block 2110, an extraction rule(s) is generated in association with the event set.

At block 2112, a selection is received to preview an extraction rule. Such a selection may be made in accordance with the presented matching rule packages or the newly generated extraction rule. Thereafter, at block 2114, the extraction rule and events matching the extraction rule are presented. A modification to the extraction rule and/or event data is received at block 2116. Thereafter, at block 2118, the modification is used to enhance extraction rules available for performing subsequent data extraction. Enhancing the extraction rules can occur in any number of ways including, for example, using machine learning to reorder extraction rules, replace extraction rules, modify extraction rules, or the like.

3.3 Extraction Rule Validation and Enhancement Via Run-Time Implementation

Extraction rules are not always effective for a particular set of events. Oftentimes, however, a user is unaware of ineffective extraction rules during field extraction. Further, it can be difficult and time consuming for a user to attempt to "fix" an extraction rule. Accordingly, embodiments describe herein are directed to an efficient and effective manner of validating and enhancing extraction rules, particularly while performing data or field extraction. Generally, and at a high-level, extraction rules can be monitored as applied to a set of events in an effort to extract data. In cases that an extraction rule(s) is deemed invalid, a new extraction rule(s) can be generated (e.g., automatically or based on a user selection). Such a new extraction rule can be used to improve or enhance the set of extraction rules stored or accessible for subsequent use.

Figure 22:
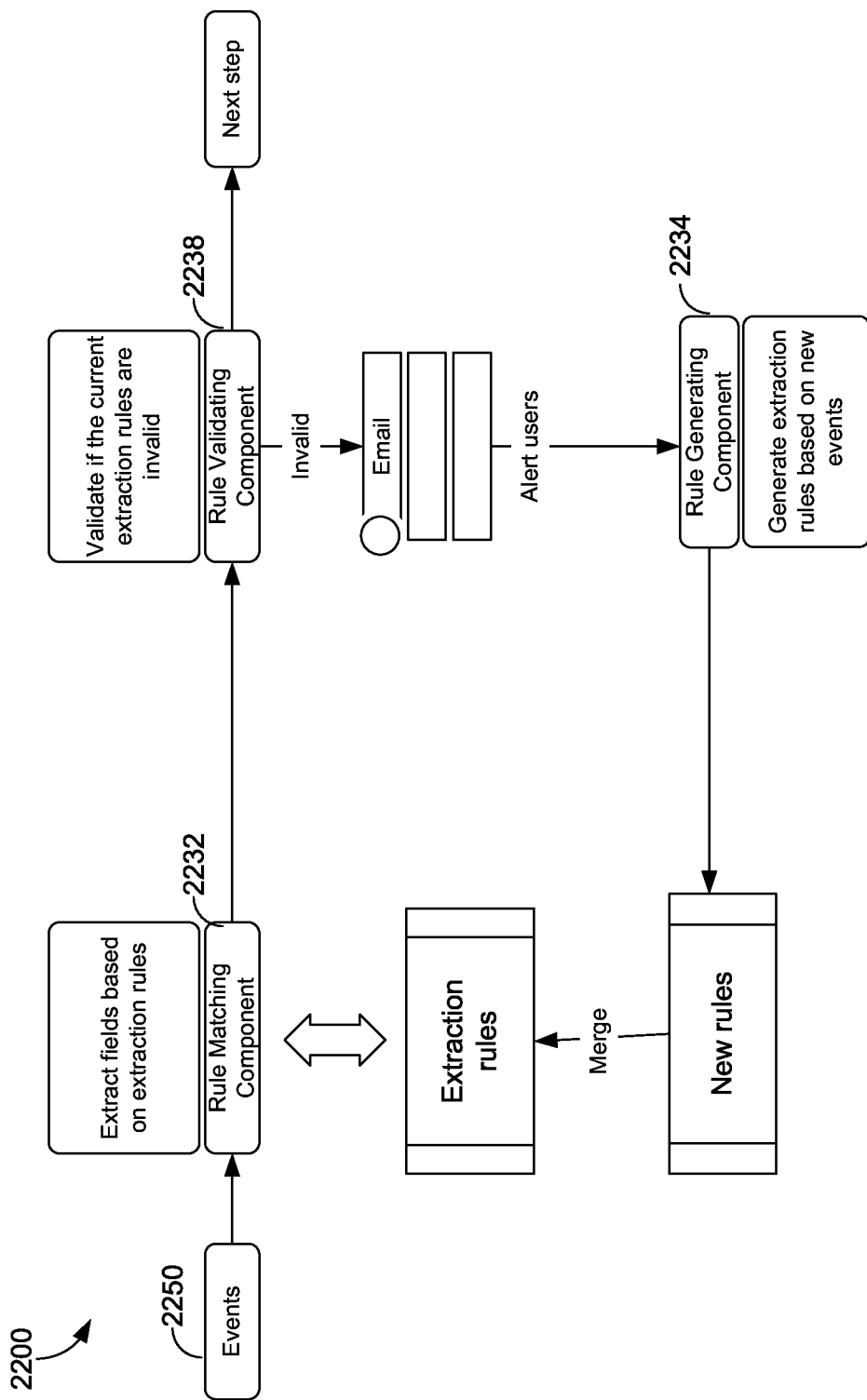
FIG. 22 provides an illustrative implementation of facilitating validation and enhancement of extraction rules, according to embodiments of the present invention.

FIG. 22 provides an illustrative implementation 2200 of facilitating validation and enhancement of extraction rules. Implementation 2200 can be used to monitor and, if needed, generate extraction rules that can be subsequently used for performing data extraction. Such an implementation or workflow may be referred to herein as a run-time implementation or workflow. As shown, the run-time implementation 2200 can include a rule matching component 2232, a rule generating component 2234, and a rule validating component 2238. Such components may be similar to the corresponding components discussed in reference to FIG. 18.

As illustrated in FIG. 22, events 2250 can be input into rule matching component 2232. The input events 2250 can generally be any set of events. In some cases, the events are events input at ingest, index, or search time. The rule matching component 2232 can facilitate identification of one or more extraction rules that correspond with or match the events. As such, the rule matching component 2232 matches one or more extraction rules with events. In this way, the rule matching component 2232 may reference extraction rules stored in extraction rule data store and analyze extraction rules to identify one or more extraction rules that correspond with or match an event set.

Identifying extraction rules that match or correspond with a set of events can occur in any number of ways. In one implementation, the rule matching component 2232 may determine match rates associated with one or more extraction rules (e.g., rule packages). The match rates determined by the rule matching component 2232 can then be used to determine one or more extraction rules that match an event set. For example, an extraction rule(s) (e.g., rule packages) associated with a highest match rate may be considered a match with input events 2250. In some cases, extraction rules deemed to match an event set, and corresponding match rates, can be provided to a user, via a graphical user interface, for selection or confirmation by the user to use the extraction rules for data extraction. In other cases, the extraction rule(s) deemed to match an event set may be automatically identified for application to the event set 2250 to extract data or fields.

Although implementation 2200 is shown using a rule matching component 2232 by matching extraction rules to events, in additional or alternative embodiments, extraction rules can be identified in other manners. For example, in some cases, a user may select or input an extraction rule for use in extraction data.

Upon identifying extraction rules to apply for data extraction, the rule matching component 2232 can utilize the identified extraction rules to extract data, or fields, from the event set 2250. In accordance with rule matching component 2232 performing data extraction, or attempting to extract data, the rule validating component 2238 can identify if an extraction rule, such as a current extraction rule, is valid. In this regard, the rule validating component 2238 may determine an extraction rule is invalid in cases in which the extraction rule cannot match any events (e.g., of the event set 2250). In cases in which an extraction rule(s) is determined to be invalid, the rule generating component 2234 can generate a new extraction rule(s) for application to the event set 2250. As can be appreciated, the new extraction rule(s) can be applied to the current event set 2250 and/or stored for subsequent use.

In some cases, prior to the rule generating component 2234 generating a new extraction rule(s), an alert or notification can be provided to a user to indicate an invalid extraction rule. The user may also be provided with an option to generate new extraction rules. Upon selection to generate new extraction rules, the rule generating component 2234 can operate to generate a new extraction rule(s).

Figure 23:
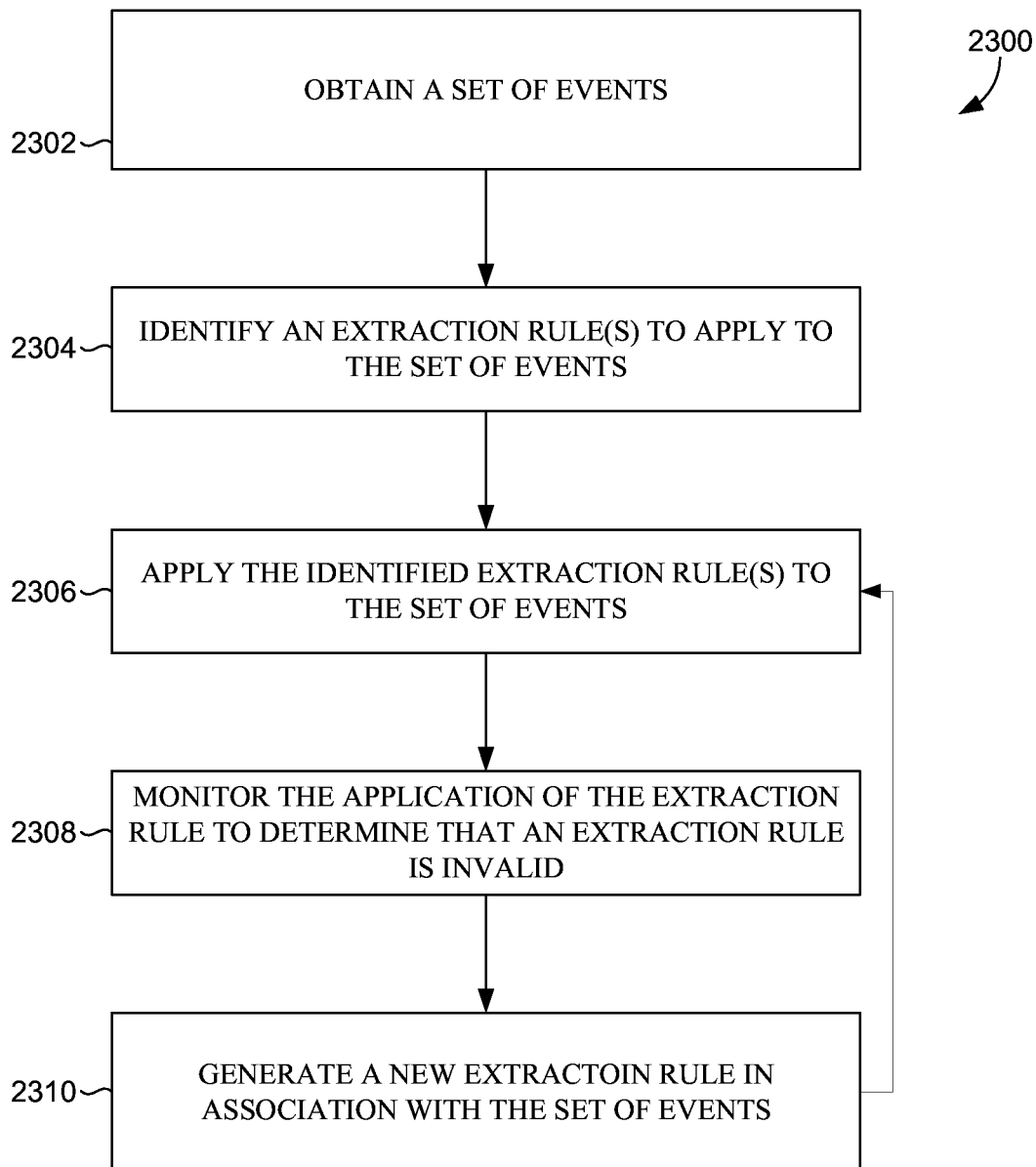
FIG. 23 illustrates a method of validating and enhancing extraction rules, in accordance with embodiments of the present invention.

FIG. 23 illustrates a method of validating and enhancing extraction rules, in accordance with embodiments of the present invention. As can be appreciated, additional or alternative steps may also be included in different embodiments. Such a method 2300 may be performed, for example, at a field extraction system, such as field extraction system 1816 of FIG. 18.

Initially, at block 2302, a set of events are obtained. Such a set of events may be obtained, for example, at ingest time, index time, or search time. At block 2304, an extraction rule(s) is identified to apply to the set of events. An extraction rule(s) to apply to a set of events can be identified in any number of ways. For example, a rule matching component may be used to identify an extraction rule(s) or rule package(s) that matches the events. As another example, an extraction rule(s) to apply to a set of inputs may be selected or input by a user. At block 2306, the identified extraction rule(s) is applied to the set of events. In accordance with the application of the extraction rule(s), at block 2308, the application of the extraction rule is monitored to determine if an extraction rule is invalid. For example, if an extraction rule does not result in any matches with events, the extraction rule can be deemed invalid. In cases that the extraction rule is deemed invalid, at block 2310, a new extraction rule(s) can be generated in association with the set of events and returned to block 2306 for application to the events.

3.4 Illustrative Hardware System

The systems and methods described above may be implemented in a number of ways. One such implementation includes computer devices having various electronic components. For example, components of the system in FIG. 18 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors in programmed computers. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 24:
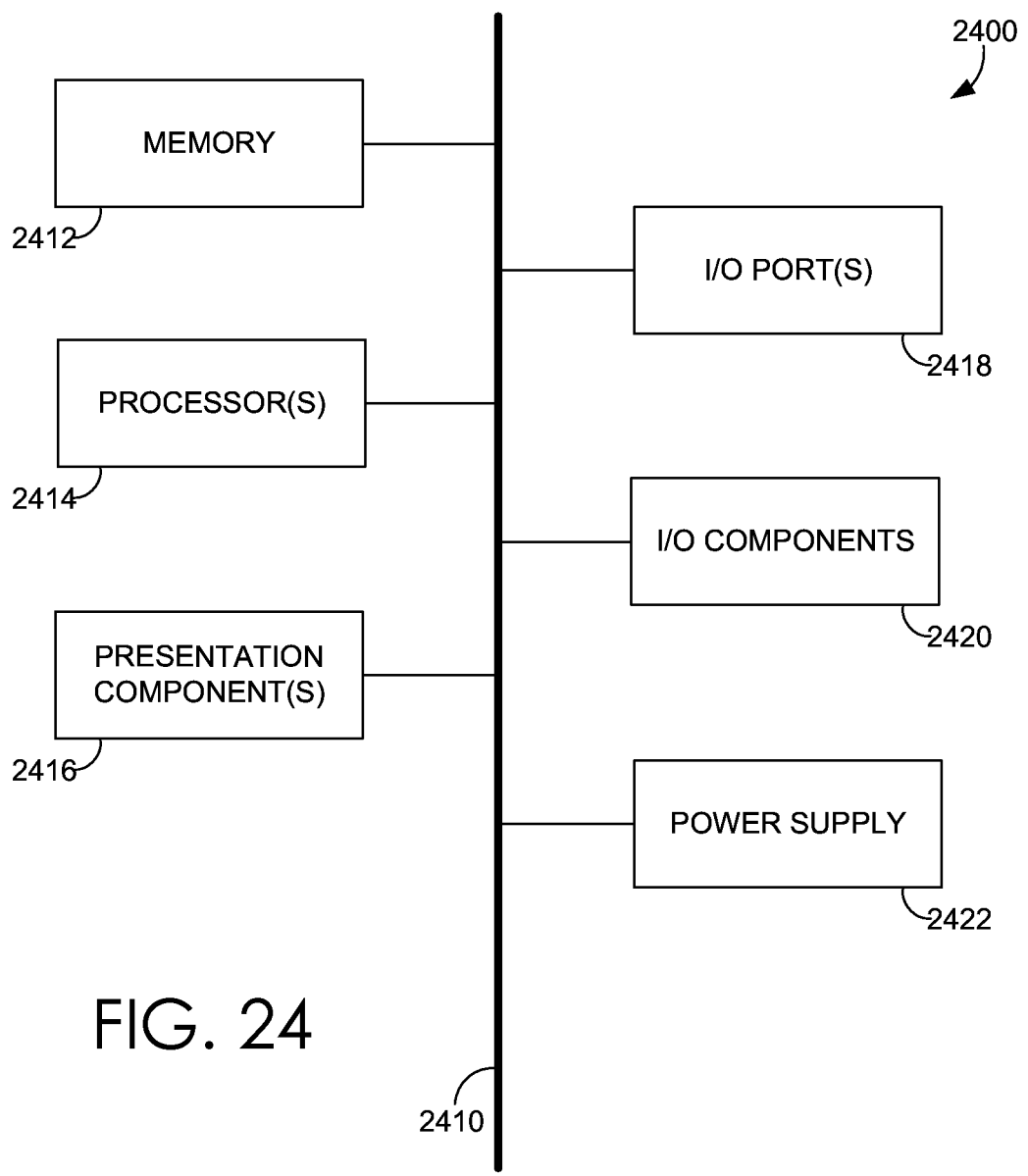
FIG. 24 is a block diagram of an example computing device in which embodiments of the present disclosure may be employed.

An example operating environment in which embodiments of the present invention may be implemented is described below in order to provide a general context for various aspects of the present invention. Referring to FIG. 24, an illustrative operating environment for implementing embodiments of the present invention is shown and designated generally as computing device 2400. Computing device 2400 is but one example of a suitable operating environment and is not intended to suggest any limitation as to the scope of use or functionality of the invention. Neither should the computing device 2400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialized computing devices, etc. The invention may also be practiced in distributed computing environments where tasks are performed by remote-processing devices that are linked through a communications network.

With reference to FIG. 24, computing device 2400 includes a bus 2410 that directly or indirectly couples the following devices: memory 2412, one or more processors 2414, one or more presentation components 2416, input/output (I/O) ports 2418, I/O components 2420, and an illustrative power supply 2422. Bus 2410 represents what may be one or more busses (such as, for example, an address bus, data bus, or combination thereof). Although depicted in FIG. 24, for the sake of clarity, as delineated boxes that depict groups of devices without overlap between these groups of devices, in reality, this delineation is not so clear cut and a device may well fall within multiple ones of these depicted boxes. For example, one may consider a display to be one of the one or more presentation components 2416 while also being one of the I/O components 2420. As another example, processors have memory integrated therewith in the form of cache; however, there is no overlap depicted between the one or more processors 2414 and the memory 2412. A person of skill in the art will readily recognize that such is the nature of the art, and it is reiterated that the diagram of FIG. 24 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 2400 of FIG. 24 and any other reference to "computing device," unless the context clearly indicates otherwise.

Computing device 2400 typically includes a variety of computer-readable media. Computer-readable media can be any available media that can be accessed by computing device 2400 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2400. Computer storage media does not comprise signals per se, such as, for example, a carrier wave. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 2412 includes computer storage media in the form of volatile and/or nonvolatile memory. The memory may be removable, non-removable, or a combination thereof. Typical hardware devices may include, for example, solid-state memory, hard drives, optical-disc drives, etc. Computing device 2400 includes one or more processors 2414 that read data from various entities such as memory 2412 or I/O components 2420. Presentation component(s) 2416 present data indications to a user or other device. Illustrative presentation components include a display device, speaker, printing component, vibrating component, etc.

I/O ports 2418 allow computing device 2400 to be logically coupled to other devices including I/O components 2420, some of which may be built in. Illustrative components include a keyboard, mouse, microphone, joystick, game pad, satellite dish, scanner, printer, wireless device, etc. The I/O components 2420 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 2400. The computing device 2400 may be equipped with depth cameras, such as stereoscopic camera systems, infrared camera systems, RGB camera systems, touchscreen technology, and combinations of these, for gesture detection and recognition. Additionally, the computing device 2400 may be equipped with accelerometers or gyroscopes that enable detection of motion.

As can be understood, implementations of the present disclosure provide for various approaches to relating data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
    obtaining a set of events for which field extraction is desired, each event comprising a time stamp and a portion of raw machine data, wherein the raw machine data is produced by one or more components within an information technology environment and reflects activity within the information technology environment;
    applying an extraction rule, of a set of extraction rules, to the set of events to extract fields of the events, the set of extraction rules associated with a same source type corresponding with a source from which the set of events is obtained;
    determining that the applied extraction rule is invalid based on the applied extraction rule not matching a threshold number of events of the set of events within a predetermined amount of time; and
    based on the applied extraction rule being invalid, generating a new extraction rule to apply to the set of events.

2. The computer-implemented method of claim 1, wherein the extraction rule is one of a plurality of extraction rules to apply to the set of events.

3. The computer-implemented method of claim 1, wherein the extraction rule is one extraction rule of a rule package identified as matching the set of events.

4. The computer-implemented method of claim 1, wherein the applied extraction rule is determined as invalid based on the applied extraction rule not matching any event of the set of events.

5. The computer-implemented method of claim 1, wherein the applied extraction rule is determined as invalid based on the applied extraction rule not matching any event of the set of events within a predetermined amount of time.

6. The computer-implemented method of claim 1 further comprising receiving a selection of the extraction rule to apply to the set of events.

7. The computer-implemented method of claim 1 further comprising receiving a selection of the extraction rule to apply to the set of events, wherein the extraction rule is selected based on a match rate associated with the extraction rule.

8. The computer-implemented method of claim 1 further comprising:
upon determining that the applied extraction rule is invalid, providing a notification indicating the invalid extraction rule; and
receiving a selection to generate the new extraction rule to apply to the set of events.

9. The computer-implemented method of claim 1 further comprising storing the new extraction rule for applying to other events.

10. The computer-implemented method of claim 1 further comprising storing the new extraction rule with the set of extraction rules including the applied extraction rule, the set of extraction rules available for application to other events.

11. The computer-implemented method of claim 1 further comprising using the new extraction rule to extract fields of the events in the set of events.

12. The computer-implemented method of claim 1 further comprising using the new extraction rule to enhance the set of extraction rules available for applying to other events to extract fields.

13. The computer-implemented method of claim 1, wherein the new extraction rule is generated based on analysis of at least a portion of the set of events.

14. One or more non-transitory computer storage media having instructions stored thereon, wherein the instructions, when executed by a computing device, cause the computing device to:
obtain a set of events for which field extraction is desired, each event comprising a time stamp and a portion of raw machine data, wherein the raw machine data is produced by one or more components within an information technology environment and reflects activity within the information technology environment;
apply an extraction rule, of a set of extraction rules, to the set of events to extract fields of the events, the set of extraction rules associated with a same source type corresponding with a source from which the set of events is obtained;
determine that the applied extraction rule is invalid based on the applied extraction rule not matching a threshold number of events of the set of events within a predetermined amount of time; and
based on the applied extraction rule being invalid, generate a new extraction rule to apply to the set of events.

15. The one or more non-transitory computer storage media of claim 14, wherein the extraction rule is one of a plurality of extraction rules to apply to the set of events.

16. The one or more non-transitory computer storage media of claim 14, wherein the extraction rule is one extraction rule of a rule package identified as matching the set of events.

17. The one or more non-transitory computer storage media of claim 14, wherein the applied extraction rule is determined as invalid based on the applied extraction rule not matching any event of the set of events.

18. The one or more non-transitory computer storage media of claim 14, wherein the applied extraction rule is determined as invalid based on the applied extraction rule not matching any event of the set of events within a predetermined amount of time.

19. The one or more non-transitory computer storage media of claim 14 further comprising receiving a selection of the extraction rule to apply to the set of events.

20. The one or more non-transitory computer storage media of claim 14 further comprising receiving a selection of the extraction rule to apply to the set of events, wherein the extraction rule is selected based on a match rate associated with the extraction rule.

21. A computing system comprising:
one or more processors; and
a memory coupled with the one or more processors, the memory having instructions stored thereon, wherein the instructions, when executed by the one or more processors, cause the computing system to:
obtain a set of events for which field extraction is desired, each event comprising a time stamp and a portion of raw machine data, wherein the raw machine data is produced by one or more components within an information technology environment and reflects activity within the information technology environment;
apply an extraction rule, of a set of extraction rules, to the set of events to extract fields of the events, the set of extraction rules associated with a same source type corresponding with a source from which the set of events is obtained;
determine that the applied extraction rule is invalid based on the applied extraction rule not matching a threshold number of events of the set of events within a predetermined amount of time; and
based on the applied extraction rule being invalid, generate a new extraction rule to apply to the set of events.

22. The computer-implemented method of claim 1 further comprising receiving a selection of the extraction rule to apply to the set of events, wherein the extraction rule is selected based on a match rate associated with the extraction rule.

23. The system of claim 21 further comprising:
upon determining that the applied extraction rule is invalid, provide a notification indicating the invalid extraction rule; and
receive a selection to generate the new extraction rule to apply to the set of events.

24. The system of claim 21 further comprising storing the new extraction rule for applying to other events.

25. The system of claim 21 further comprising storing the new extraction rule with the set of extraction rules including the applied extraction rule, the set of extraction rules available for application to other events.

26. The system of claim 21 further comprising using the new extraction rule to extract fields of the events in the set of events.

27. The system of claim 21 further comprising using the new extraction rule to enhance the set of extraction rules available for applying to other events to extract fields.

28. The system of claim 21, wherein the new extraction rule is generated based on analysis of at least a portion of the set of events.

* * * * *